United States Patent
Zenitani et al.

(10) Patent No.: US 12,215,033 B2
(45) Date of Patent: *Feb. 4, 2025

(54) SILICA PARTICLES COMPRISING NITROGEN ELEMENT-CONTAINING COMPOUND CONTAINING MOLYBDENUM ELEMENT

(71) Applicant: FUJIFILM Business Innovation Corp., Tokyo (JP)

(72) Inventors: Yuka Zenitani, Kanagawa (JP); Sakae Takeuchi, Kanagawa (JP); Koji Sasaki, Kanagawa (JP); Yoshifumi Eri, Kanagawa (JP); Mai Mochida, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 204 days.

This patent is subject to a terminal disclaimer.

(21) Appl. No.: 17/584,390

(22) Filed: Jan. 26, 2022

(65) Prior Publication Data

US 2022/0315432 A1    Oct. 6, 2022

(30) Foreign Application Priority Data

Mar. 25, 2021  (JP) ................................. 2021-052444
Sep. 24, 2021  (JP) ................................. 2021-156197

(51) Int. Cl.
    *C01B 33/18*     (2006.01)
    *B82Y 30/00*     (2011.01)
    *B82Y 40/00*     (2011.01)
    *C01B 33/159*    (2006.01)

(52) U.S. Cl.
CPC ............ *C01B 33/18* (2013.01); *C01B 33/159* (2013.01); *B82Y 30/00* (2013.01); *B82Y 40/00* (2013.01); *C01P 2004/03* (2013.01); *C01P 2004/51* (2013.01); *C01P 2004/62* (2013.01); *C01P 2004/64* (2013.01); *C01P 2004/80* (2013.01); *C01P 2006/14* (2013.01); *C01P 2006/17* (2013.01); *C01P 2006/80* (2013.01); *C01P 2006/90* (2013.01)

(58) Field of Classification Search
CPC ....... C01B 33/18; C01B 33/159; B82Y 30/00; B82Y 40/00; C01P 2004/03; C01P 2004/51; C01P 2004/62; C01P 2004/64; C01P 2004/80; C01P 2006/14; C01P 2006/17; C01P 2006/80; C01P 2006/90; C01P 2002/80; C01P 2002/86; C01P 2006/16; C01P 2006/40

See application file for complete search history.

(56) References Cited

U.S. PATENT DOCUMENTS 9,523,931 B2 * 12/2016 Kojima ............. G03G 9/08795
2020/0348611 A1   11/2020 Yokota et al.

FOREIGN PATENT DOCUMENTS

| JP | H09166884 | | 6/1997 |
| JP | 2001194825 | | 7/2001 |
| JP | 2008174430 | A * | 7/2008 |
| JP | 2011185998 | | 9/2011 |
| JP | 2017039618 | | 2/2017 |
| JP | 2019073418 | | 5/2019 |
| JP | 2020033224 | | 3/2020 |

OTHER PUBLICATIONS

Machine translation of JP2008174430A (Year: 2008).*

* cited by examiner

*Primary Examiner* — Alexandra M Moore
*Assistant Examiner* — Logan Edward Laclair
(74) *Attorney, Agent, or Firm* — JCIPRNET

(57) ABSTRACT

Silica particles contain a nitrogen element-containing compound containing a molybdenum element, in which a ratio (Mo/Si) of Net intensity of the molybdenum element to Net intensity of a silicon element measured by X-ray fluorescence analysis is 0.035 or more and 0.35 or less.

10 Claims, No Drawings

SILICA PARTICLES COMPRISING NITROGEN ELEMENT-CONTAINING COMPOUND CONTAINING MOLYBDENUM ELEMENT

CROSS-REFERENCE TO RELATED APPLICATIONS

This application is based on and claims priority under 35 USC 119 from Japanese Patent Application No. 2021-156197 filed Sep. 24, 2021 and Japanese Patent Application No. 2021-052444 filed Mar. 25, 2021.

BACKGROUND

(i) Technical Field

The present invention relates to silica particles.

(ii) Related Art

Silica particles are used as additive components or main components of powder paints, cosmetics, rubber, abrasives, and the like, and play the role of, for example, improving the strength of resins, improving the fluidity of powder, and suppressing packing.

For example, JP2019-073418A discloses "hydrophobic silica powder in which (1) a degree of hydrophobicity is 50% or more, (2) an extraction amount X of at least one compound selected from the group consisting of a quaternary ammonium ion, a monoazo-based complex, and a mineral ion by a mixed solvent of methanol and an aqueous methanesulfonic acid solution is 0.1% by mass or more, and (3) the X and an extraction amount Y of the above compound by water satisfy Expression (I) Y/X<0.15".

Furthermore, JP2017-039618A discloses "silica powder containing a plurality of silica particles composed of a silica structure having "Si—O" bond as a repeating unit and a quaternary ammonium salt introduced into the structure".

In addition, JP2011-185998A discloses "charge control particles to be used as an external additive configured with transport particles and a charge control agent having adhered to the surface of the transport particles, in which the transport particles are composed of hydrophobic spherical fine silica particles which are obtained by hydrophobizing the surface of hydrophilic spherical fine silica particles obtained by a sol-gel method and have an average particle size of 20 to 500 nm".

Furthermore, JP2001-194825A discloses "fine silica particles prepared by treating spherical hydrophobic fine silica particles having an average primary particle size of 0.01 to 5 μm with a compound selected from the group consisting of a quaternary ammonium salt compound, a fluoroalkyl group-containing betaine compound, and silicone oil".

Moreover, JP1997-166884A discloses "particles that are prepared by treating fine silica particles having a degree of hydrophobicity of 80% or more with an amphoteric surfactant and particles that are prepared by treating fine silica particles having a degree of hydrophobicity of 80% or more with a polymer having a quaternary ammonium salt or a quaternary ammonium group".

SUMMARY

Aspects of non-limiting embodiments of the present disclosure relate to silica particles that contain a nitrogen element-containing compound containing a molybdenum element, the silica particles having a narrower charge distribution when charged and having higher retentivity of a narrow charge distribution in a high-temperature and high-humidity environment and a low-temperature and low-humidity environment, compared to silica particles in which a ratio (Mo/Si) of Net intensity of a molybdenum element to Net intensity of a silicon element measured by X-ray fluorescence analysis is less than 0.035 and more than 0.35.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

Specifically, non-limiting embodiments of the present disclosure include the following aspects.

According to an aspect of the present disclosure, there are provided silica particles that contain a nitrogen element-containing compound containing a molybdenum element, in which a ratio (Mo/Si) of Net intensity of the molybdenum element to Net intensity of a silicon element measured by X-ray fluorescence analysis is 0.035 or more and 0.35 or less.

DETAILED DESCRIPTION

The exemplary embodiments of the present invention will be described below. The following descriptions and examples merely illustrate the exemplary embodiments, and do not limit the scope of the exemplary embodiments.

Regarding the ranges of numerical values described in stages in the present specification, the upper limit or lower limit of a range of numerical values may be replaced with the upper limit or lower limit of another range of numerical values described in stages. Furthermore, in the present disclosure, the upper limit or lower limit of a range of numerical values may be replaced with values described in examples.

In the present specification, each component may include a plurality of corresponding substances.

In a case where the amount of each component in a composition is mentioned in the present specification, and there are two or more kinds of substances corresponding to each component in the composition, unless otherwise specified, the amount of each component means the total amount of two or more kinds of the substances present in the composition.

Silica Particles

The silica particles according to the present exemplary embodiment contain a nitrogen element-containing compound containing a molybdenum element (hereinafter, also simply called nitrogen element-containing compound), in which a ratio (Mo/Si) of Net intensity of the molybdenum element to Net intensity of a silicon element measured by X-ray fluorescence analysis is 0.035 or more and 0.35 or less.

Due to the above configuration, the silica particles according to the present exemplary embodiment have a narrow charge distribution when charged and have excellent retentivity of a narrow charge distribution in a high-temperature and high-humidity environment and a low-temperature and low-humidity environment. The reason is presumed as follows.

Silica particles have a strong tendency to be negatively charged and are sometimes excessively charged. Therefore, the silica particles have a wide charge distribution. Particularly, in a high-temperature and high-humidity environment and a low-temperature and low-humidity environment, the silica particles are likely to be excessively charged, and the charge distribution tends to further widen.

For example, in powder coating, a powder paint charged by a method, such as contact electrification or corona discharge, is jetted and electrostatically stuck to an object to be coated and then heated to form a coating film.

In a case where silica particles that have a wide charge distribution when charged are used as an external additive for the powder paint, variation occurs in the charge of the powder paint, which makes it difficult to stick a uniform amount of the powder paint to the object to be coated.

On the other hand, in a case where a nitrogen element-containing compound is adsorbed onto silica particles, it is possible to prevent the silica particles from carrying an excess of negative charge when charged. The nitrogen element-containing compound tends to be positively charged, and the silica particles onto which the nitrogen element-containing compound is adsorbed cancel out the excess of negative charge and are inhibited from carrying the excess of negative charge.

However, in a case where a nitrogen element-containing compound is simply adsorbed onto silica particles, a negative charge distribution and a positive charge distribution widen. Furthermore, as described above, especially in a high-temperature and high-humidity environment (for example, 30° and 90% RH) and a low-temperature and low-humidity environment (for example, in an environment at 10° C. and 10% RH), the silica particles are likely to be excessively charged. Therefore, the silica particles tend to have a wider charge distribution and the charge distribution retentivity deteriorates.

Therefore, as a nitrogen element-containing compound, a nitrogen element-containing compound containing a molybdenum element is used, and in the silica particles, a ratio (Mo/Si) of Net intensity of the molybdenum element to Net intensity of a silicon element measured by X-ray fluorescence analysis is set to 0.035 or more and 0.35 or less.

In a case where a nitrogen element-containing compound containing a molybdenum element is used as a nitrogen element-containing compound, the activity of a nitrogen element is enhanced, and even though the nitrogen element-containing compound is not on the outermost surface of the silica particles but on the inside of pores, because the nitrogen element tends to be positively charged, it is easy to inhibit the silica particles from being excessively charged particularly in a high-temperature and high-humidity environment and a low-temperature and low-humidity environment. In addition, because the interaction with a cationic portion having a nitrogen element is enhanced, the cationic portion is less likely to be detached, so that the retentivity is also improved. Furthermore, by the abundance ratio of a molybdenum element, it is possible to adjust the charging properties of the silica particles so that the particles are positively or negatively charged as required.

Moreover, in a case where the nitrogen element-containing compound containing a molybdenum element having the aforementioned properties is incorporated into the silica particles so that the ratio (Mo/Si) of Net intensity of the molybdenum element to Net intensity of silicon element falls into the above range, the silica particles have a narrow charge distribution, and the retentivity of the narrow charge distribution is improved even in a high-temperature and high-humidity environment and a low-temperature and low-humidity environment.

Presumably, for the aforementioned reasons, the silica particles according to the present exemplary embodiment may have a narrow charge distribution when charged and may have excellent retentivity of a narrow charge distribution in a high-temperature and high-humidity environment and a low-temperature and low-humidity environment.

Furthermore, for example, in a case where the silica particles according to the present exemplary embodiment are used as an external additive for a powder paint, even in a high-temperature and high-humidity environment and a low-temperature and low-humidity environment, a variation in charge is less likely to occur in the powder paint, the retentivity is improved, and a uniform amount of the powder paint can be stuck to an object to be coated.

It is preferable that the silica particles according to the present exemplary embodiment satisfy, for example, either the following aspect (A) or the following aspect (B).

Aspect (A): in a case where A represents a pore volume of pores having a diameter of 1 nm or more and 50 nm or less determined from a pore size distribution curve obtained by a nitrogen adsorption method before baking at 350° C., and B represents a pore volume of pores having a diameter of 1 nm or more and 50 nm or less determined from a pore size distribution curve obtained by a nitrogen adsorption method after baking at 350° C., B/A is 1.2 or more and 5 or less, and B is 0.2 cm$^3$/g or more and 3 cm$^3$/g or less.

Hereinafter, "pore volume A of pores having a diameter of 1 nm or more and 50 nm or less determined from a pore size distribution curve obtained by a nitrogen adsorption method before baking at 350° C." will be also called "pore volume A before baking at 350° C.".

On the other hand, "pore volume B of pores having a diameter of 1 nm or more and 50 nm or less determined from a pore size distribution curve obtained by a nitrogen adsorption method after baking at 350° C." will be also called "pore volume B after baking at 350° C.".

Aspect (B): in a case where C represents an integral value of signals observed in a range of chemical shift of −50 ppm or more and −75 ppm or less in a $^{29}$Si solid-state nuclear magnetic resonance (NMR) spectrum obtained by a cross-polarization/magic angle spinning (CP/MAS) method (hereinafter, also called "Si—CP/MAS NMR spectrum"), and D represents an integral value of signals observed in a range of chemical shift of −90 ppm or more and −120 ppm or less in the same spectrum, a ratio C/D is 0.10 or more and 0.75 or less.

Due to the above configuration, the silica particles according to the aspect (A) or (B) have a narrow charge distribution when charged. The reason is presumed as follows.

As described above, in a case where a nitrogen element-containing compound is adsorbed onto silica particles, it is possible to prevent the silica particles from carrying an excess of negative charge when charged. The nitrogen element-containing compound tends to be positively charged, and the silica particles onto which the nitrogen element-containing compound is adsorbed cancel out the excess of negative charge and are inhibited from carrying the excess of negative charge.

However, because the nitrogen element-containing compound tends to be positively charged, in a case where this compound is adsorbed onto the outermost surface of silica particles, a negative charge distribution and a positive charge distribution widen. Therefore, it is preferable that the nitrogen element-containing compound be, for example, in pores and the like rather than covering the surface of the silica particles.

The silica particles according to the aspect (A) have characteristics in which the pore volume A before baking at 350° C. and the pore volume B after baking at 350° C. have the relationship described above.

The pore volume B after baking at 350° C. is a pore volume determined after the volatilization of the nitrogen element-containing compound adsorbed onto the pores of the silica particles by baking and clogging some of the pores. Therefore, B/A of 1.2 or more and 5 or less and B of 0.2 cm$^3$/g or more and 3 cm$^3$/g or less mean that a sufficient amount of nitrogen element-containing compound is adsorbed onto at least some of the pores of the silica particles. Accordingly, the charge distribution is further narrowed by the nitrogen element-containing compound.

On the other hand, in the silica particles according to the aspect (B), the ratio C/D of C as an integral value of signals observed in a range of chemical shift of −50 ppm or more and −75 ppm or less in a Si—CP/MAS NMR spectrum to D as an integral value of signals observed in a range of chemical shift of −90 ppm or more and −120 ppm or less in the same spectrum falls into the range described above.

Showing signals having integral values that fall into the above range means that a low-density structure (for example, a SiO$_{2/3}$CH$_3$ layer) is formed on the surface of at least some of the silica particles, the structure being configured with a reaction product of a silane coupling agent (particularly, a trifunctional silane coupling agent) onto which a sufficient amount of nitrogen element-containing compound is adsorbed. The structure configured with a reaction product of a silane coupling agent (particularly, a trifunctional silane coupling agent) has a low density and is in the form of pores onto which the nitrogen element-containing compound is easily adsorbed.

Accordingly, the charge distribution is further narrowed by the nitrogen element-containing compound.

Presumably, for the aforementioned reasons, the silica particles according to the aspect (A) or (B) may have a narrow charge distribution when charged.

Hereinafter, the silica particles according to the present exemplary embodiment will be specifically described.

Net Intensity Ratio (Mo/Si)

In the silica particles according to the present exemplary embodiment, a ratio (Mo/Si) of Net intensity of a molybdenum element to Net intensity of a silicon element measured by X-ray fluorescence analysis is 0.035 or more and 0.35 or less. From the viewpoint of charge distribution narrowing and charge distribution retentivity, the ratio (Mo/Si) is, for example, preferably 0.07 or more and 0.32 or less, and more preferably 0.10 or more and 0.30 or less.

From the viewpoint of charge distribution narrowing and charge distribution retentivity, Net intensity of the molybdenum element is, for example, preferably 5 kcps or more and 75 kcps or less, 7 kcps or more and 50 kcps or less, 8 kcps or more and 55 kcps or less, or 10 kcps or more and 40 kcps or less.

Net intensity of the molybdenum element and the silicon element is measured as follows.

Approximately 0.5 g of silica particles are compressed using a compression molding machine by being pressed under a load of 6 tons for 60 seconds, thereby preparing a disk having a diameter of 50 mm and a thickness of 2 mm. This disk is used as a sample for qualitative quantitative elemental analysis performed under the following conditions by using a scanning X-ray fluorescence spectrometer (XRF-1500, manufactured by Shimadzu Corporation), and Net intensity of each of the molybdenum element and the silicon element is determined (unit: kilo counts per second, kcps).

Tube voltage: 40 kV
Tube current: 90 mA
Measurement area (analysis diameter): diameter of 10 mmφ
Measurement time: 30 minutes
Anticathode: Rhodium Pore Volume In the silica particles according to the present exemplary embodiment, the ratio B/A of the pore volume B after baking at 350° C. to the pore volume A before baking at 350° C. is 1.2 or more and 5 or less. From the viewpoint of charge distribution narrowing, the ratio B/A is, for example, preferably 1.4 or more and 3 or less, and more preferably 1.4 or more and 2.5 or less.

The pore volume B after baking at 350° C. is 0.2 cm$^3$/g or more and 3 cm$^3$/g or less. From the viewpoint of charge distribution narrowing, the pore volume B after baking at 350° C. is, for example, preferably 0.3 cm$^3$/g or more and 1.8 cm$^3$/g or less, and more preferably 0.6 cm$^3$/g or more and 1.5 cm$^3$/g or less.

Specifically, the baking at 350° C. is carried out as follows.

In a nitrogen environment, the silica particles to be measured are heated to 350° C. at a heating rate of 10° C./min, and kept at 350° C. for 3 hours. Then, the silica particles are cooled to room temperature (25° C.) at a cooling rate of 10° C./min.

The pore volume is measured as follows.

First, the silica particles to be measured are cooled to the temperature of liquid nitrogen (−196° C.), nitrogen gas is introduced, and the amount of nitrogen gas adsorbed is determined by a constant volume method or a gravimetric method. The pressure of nitrogen gas introduced is slowly increased, and the amount of nitrogen gas adsorbed is plotted for each equilibrium pressure, thereby creating an adsorption isotherm. From this adsorption isotherm, a pore size distribution curve in which the ordinate shows a frequency and the abscissa shows a pore diameter is obtained by the equation of the BJH method.

Then, from the obtained pore size distribution curve, an integrated pore volume distribution in which the ordinate shows a volume and the abscissa shows a pore diameter is obtained. From the obtained integrated pore volume distribution, an integral value of pore volumes of pores having a diameter in a range of 1 nm or more and 50 nm or less is calculated and adopted as "pore volume of pores having a diameter of 1 nm or more and 50 nm or less".

CP/MAS NMR Spectrum

The ratio C/D of the integral value C of signals observed in a range of chemical shift of −50 ppm or more and −75 ppm or less in a Si—CP/MAS NMR spectrum to the integral value D of signals observed in a range of chemical shift of −90 ppm or more and −120 ppm or less in the same spectrum is 0.10 or more and 0.75 or less. From the viewpoint of charge distribution narrowing, the ratio C/D is, for example, preferably 0.12 or more and 0.45 or less, and more preferably 0.15 or more and 0.40 or less.

From the viewpoint of charge distribution narrowing, in a case where the integral value of all signals in Si—CP/MAS NMR spectrum is regarded as 100%, the ratio of the integral value C (Signal ratio) of the signals observed in a range of chemical shift of −50 ppm or more and −75 ppm or less is, for example, preferably 5 (unit: %) or more, and more preferably 7 (unit: %) or more. The upper limit of the ratio of the integral value C of the signals is, for example, 60% or less.

The Si—CP/MAS NMR spectrum can be obtained by measuring a sample by nuclear magnetic resonance spectroscopy under the following conditions.

Spectrometer: AVANCE 300 (manufactured by Bruker)
Resonance frequency: 59.6 MHz
Measurement nucleus: $^{29}$Si
Measurement method: CPMAS method (using Bruker's standard ParC sequence cp.av)
Waiting time: 4 sec
Contact time: 8 ms
Number of times of integration: 2,048
Measurement temperature: room temperature (25° C., measured temperature)
Center frequency of observation: −3975.72 Hz
MAS rotation speed: 7.0 mm-6 kHz
Reference substance: hexamethylcyclotrisiloxane Configuration of Silica Particles The silica particles according to the present exemplary embodiment contain a nitrogen element-containing compound.

Specifically, the silica particles according to the present exemplary embodiment have, for example, a structure consisting of silica base particles, at least one reaction product which is selected from the group consisting of a monofunctional silane coupling agent, a difunctional silane coupling agent, and a trifunctional silane coupling agent (hereinafter, also called "reaction product of a silane coupling agent") and covers at least a part of surface of the silica base particles, and a nitrogen element-containing compound which is adsorbed onto at least a part of the reaction product. Forming this structure makes it possible to control the pore volume characteristics and Si—CP/MAS·NMR spectral characteristics described above. In addition, it is possible to control the degree of hydrophobicity and the amount of OH groups which will be described later.

Furthermore, the silica particles according to the present exemplary embodiment may have a hydrophobized structure on the surface of the structure described above.

Silica Base Particles

The silica base particles are silica particles for a structure to be formed on at least a part of surface thereof, the structure consisting of the reaction product of a silane coupling agent and a nitrogen element-containing compound adsorbed onto at least a part of pores of the reaction product.

Examples of the silica base particles include dry silica particles and wet silica particles.

Examples of the dry silica particles include silica by a combustion method (fumed silica) obtained by combustion of a silane compound and silica by a deflagration method obtained by explosive combustion of metallic silicon powder.

Examples of the wet silica particles include wet silica particles obtained by a neutralization reaction between sodium silicate and a mineral acid (silica by a precipitation method synthesized·aggregated under alkaline conditions, silica particles by a gelation method synthesized aggregated under acidic conditions), colloidal silica particles obtained by alkalifying and polymerizing acidic silicate (silica sol particles), and silica particles by a sol-gel method obtained by the hydrolysis of an organic silane compound (for example, alkoxysilane).

Among these, as the silica base particles, from the viewpoint of charge distribution narrowing, for example, silica particles by a sol-gel method are preferable.

Reaction Product of Silane Coupling Agent

The adsorptive structure configured with a reaction product of a silane coupling agent (particularly, a reaction product of a trifunctional silane coupling agent) has a low density and a high affinity with a nitrogen element-containing compound. Therefore, this structure makes it easy for the nitrogen element-containing compound to be adsorbed onto the deep portions of pores and increases the amount (that is, content) of the nitrogen element-containing compound adsorbed. The adhesion of the nitrogen element-containing compound, which tends to be positively charged, to the surface of silica which tends to be negatively charged produces an effect of canceling out an excess of negative charge. In addition, because the nitrogen element-containing compound is adsorbed not onto the outermost surface of the silica particles but onto the inside of the low-density structure, the silica particles are prevented from carrying an excess of positive charge and thus having a wider charge distribution. Furthermore, because only an excess of negative charge is canceled out, the charge distribution is further narrowed.

Examples of the reaction product of a silane coupling agent include a reaction product represented by General Formula (TA) in which $OR^2$ is substituted with a OH group, a reaction product obtained by the polycondensation of compounds represented by General Formula (TA) in which $OR^2$ is substituted with a OH group, and a reaction product obtained by the polycondensation of a compound represented by General Formula (TA) in which $OR^2$ is substituted with a OH group and a SiOH group of silica particles. In addition, the reaction product of a silane coupling agent includes these reaction products in which all or some of these $OR^2$'s are substituted, and reaction products obtained by the polycondensation of all or some of the aforementioned compounds.

The silane coupling agent is a non-nitrogen element-containing compound that does not contain N (nitrogen element).

Specifically, examples of the silane coupling agent include a silane coupling agent represented by General Formula (TA).

$$R^1{}_n\!-\!Si(OR^2)_{4\text{-}n} \qquad \text{General Formula (TA):}$$

In General Formula (TA), $R^1$ represents a saturated or unsaturated aliphatic hydrocarbon group having 1 or more and 20 or less carbon atoms or an aromatic hydrocarbon group having 6 or more and 20 or less carbon atoms, and $R^2$ represents a halogen atom or an alkoxy group. The plurality of R2's may be the same group or different groups. n represents an integer of 1 or more and 3 or less.

The aliphatic hydrocarbon group represented by $R^1$ may be linear, branched, or cyclic. The aliphatic hydrocarbon group is, for example, preferably linear or branched. The number of carbon atoms in the aliphatic hydrocarbon group is, for example, preferably 1 or more and 20 or less, more preferably 1 or more and 18 or less, even more preferably 1 or more and 12 or less, and still more preferably 1 or more and 10 or less. The aliphatic hydrocarbon group may be saturated or unsaturated. The aliphatic hydrocarbon group is, for example, preferably a saturated aliphatic hydrocarbon group, and more preferably an alkyl group.

Examples of the saturated aliphatic hydrocarbon group include a linear alkyl group (such as a methyl group, an ethyl group, a propyl group, a butyl group, a pentyl group, a hexyl group, a heptyl group, an octyl group, a nonyl group, a decyl group, a dodecyl group, a hexadecyl group, or an eicosyl group), a branched alkyl group (such as an isopropyl group, an isobutyl group, an isopentyl group, a neopentyl group, a 2-ethylhexyl group, a tertiary butyl group, a tertiary pentyl group, or an isopentadecyl group), a cyclic alkyl group (such as a cyclopropyl group, a cyclopentyl group, a cyclohexyl group, a cycloheptyl group, a cyclooctyl group, a tricyclodecyl group, a norbornyl group, or an adamantyl group), and the like.

Examples of the unsaturated aliphatic hydrocarbon group include an alkenyl group (such as a vinyl group (ethenyl group), a 1-propenyl group, a 2-propenyl group, a 2-butenyl group, a 1-butenyl group, a 1-hexenyl group, a 2-dodecenyl group, or a pentenyl group), an alkynyl group (such as an ethynyl group, a 1-propynyl group, a 2-propynyl group, a 1-butynyl group, a 3-hexynyl group, or a 2-dodecynyl group), and the like.

The number of carbon atoms in the aromatic hydrocarbon group represented by $R^1$ is, for example, preferably 6 or more and 20 or less, more preferably 6 or more and 18 or less, even more preferably 6 or more and 12 or less, and still more preferably 6 or more and 10 or less.

Examples of the aromatic hydrocarbon group include a phenylene group, a biphenylene group, a terphenylene group, a naphthalene group, an anthracene group, and the like.

Examples of the halogen atom represented by $R^2$ include a fluorine atom, a chlorine atom, a bromine atom, an iodine atom, and the like. As the halogen atom, for example, a chlorine atom, a bromine atom, or an iodine atom is preferable.

Examples of the alkoxy group represented by $R^2$ include an alkoxy group having 1 or more and 10 or less carbon atoms (for example, preferably having 1 or more and 8 or less carbon atoms, and more preferably having 1 or more and 4 or less carbon atoms). Examples of the alkoxy group include a methoxy group, an ethoxy group, an isopropoxy group, a t-butoxy group, an n-butoxy group, a n-hexyloxy group, a 2-ethylhexyloxy group, a 3,5,5-trimethylhexyloxy group, and the like. The alkoxy group also includes a substituted alkoxy group. Examples of substituents with which the alkoxy group can be substituted include a halogen atom, a hydroxyl group, an amino group, an alkoxy group, an amide group, a carbonyl group, and the like.

n is, for example, preferably an integer of 1 or 2, and more preferably 1.

The silane coupling agent represented by General Formula (TA) is, for example, preferably a trifunctional silane coupling agent in which $R^1$ represents a saturated aliphatic hydrocarbon group having 1 or more and 20 or less carbon atoms, $R^2$ represents a halogen atom or an alkoxy group, and n is 1.

Examples of the trifunctional silane coupling agent include
vinyltrimethoxysilane, methyltrimethoxysilane, ethyltrimethoxysilane, propyltrimethoxysilane, butyltrimethoxysilane, hexyltrimethoxysilane, n-octyltrimethoxysilane, decyltrimethoxysilane, dodecyltrimethoxysilane, vinyltriethoxysilane, methyltriethoxysilane, ethyltriethoxysilane, butyltriethoxysilane, hexyltriethoxysilane, decyltriethoxysilane, dodecyltriethoxysilane, phenyltrimethoxysilane, o-methylphenyltrimethoxysilane, p-methylphenyltrimethoxysilane, phenyltriethoxysilane, benzyltriethoxysilane, decyltrichlorosilane, and phenyltrichlorosilane (these are compounds in which $R^1$ represents an unsubstituted aliphatic hydrocarbon group or an unsubstituted aromatic hydrocarbon group);

3-glycidoxypropyltrimethoxysilane, γ-methacryloxypropyltrimethoxysilane, γ-mercaptopropyltrimethoxysilane, γ-chloropropyltrimethoxysilane, and γ-glycidyloxypropylmethyldimethoxysilane (these are compounds in which $R^1$ represents a substituted aliphatic hydrocarbon group or a substituted aromatic hydrocarbon group); and the like.

One trifunctional silane coupling agent may be used alone, or two or more trifunctional silane coupling agents may be used in combination.

Among these, from the viewpoint of charge distribution narrowing, as the trifunctional silane coupling agent, for example, alkyltrialkoxysilane is preferable, and alkyltrialkoxysilane represented by General Formula (TA) is more preferable in which $R^1$ represents an alkyl group having 1 or more and 20 or less (for example, preferably 1 or more and 15 or less) carbon atoms and $R^2$ represents an alkyl group having 1 or more and 2 or less carbon atoms.

From the viewpoint of charge distribution narrowing and charge distribution retentivity, the amount of the adhering structure, which is configured with the reaction product of a silane coupling agent, with respect to the amount of the silica particles is, for example, preferably 5.5% by mass or more and 30% by mass or less, and more preferably 7% by mass or more and 22% by mass or less.

Nitrogen Element-Containing Compound

The nitrogen element-containing compound is a nitrogen element-containing compound containing a molybdenum element, excluding ammonia and a compound that is in a gaseous state at a temperature of −200° C. or higher and 25° C. or lower.

Specifically, as the nitrogen element-containing compound, from the viewpoint of charge distribution narrowing and charge distribution retentivity, for example, at least one compound is preferable which is selected from the group consisting of a quaternary ammonium salt containing a molybdenum element (particularly, a salt of quaternary ammonium containing a molybdenum element) and a mixture of a quaternary ammonium salt and a metal oxide containing a molybdenum element.

Especially, in the salt of quaternary ammonium containing a molybdenum element, a strong bond is formed between a molybdenum element-containing anion as a negative ion and a quaternary ammonium cation as a positive ion. Therefore, the charge distribution retentivity is improved.

It is preferable that the nitrogen element-containing compound be adsorbed, for example, onto at least a part of the pores of the reaction product of a silane coupling agent described above.

One nitrogen element-containing compound containing a molybdenum element may be used alone, or two or more such compounds may be used in combination. Furthermore, the nitrogen element-containing compound containing a molybdenum element may be used in combination with a nitrogen element-containing compound that does not contain Mo (such as at least one compound selected from the group consisting of a quaternary ammonium salt, a primary amine compound, a secondary amine compound, a tertiary amine compound, an amide compound, an imine compound, and a nitrile compound; among these, for example, a quaternary ammonium salt is preferable).

The quaternary ammonium salt (quaternary ammonium salt that does not contain a molybdenum element) is not particularly limited, and known quaternary ammonium salts can be used.

From the viewpoint of charge distribution narrowing, the quaternary ammonium salt (quaternary ammonium salt that does not contain a molybdenum element) preferably has, for example, a compound represented by General Formula (AM). One compound represented by General Formula (AM) may be used alone, or two or more such compounds may be used in combination.

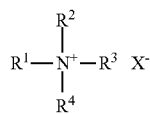

General Formula (AM)

In General Formula (AM), $R^1$, $R^2$, $R^3$, and $R^4$ each independently represent a hydrogen atom or an alkyl, aralkyl, or aryl group which may have a substituent, and $X^-$ represents an anion. Here, at least one of $R^1$, $R^2$, $R^3$, or $R^4$ represents an alkyl, aralkyl, or aryl group which may have a substituent. Furthermore, two or more of $R^1$, $R^2$, $R^3$, and $R^4$ may be linked to form an aliphatic ring, an aromatic ring, or a heterocycle.

Examples of the alkyl group represented by $R^1$ to $R^4$ include a linear alkyl group having 1 or more and 20 or less carbon atoms and a branched alkyl group having 3 or more and 20 or less carbon atoms.

Examples of the linear alkyl group having 1 or more and 20 or less carbon atoms include a methyl group, an ethyl group, a n-propyl group, a n-butyl group, a n-pentyl group, a n-hexyl group, a n-heptyl group, a n-octyl group, a n-nonyl group, a n-decyl group, a n-undecyl group, a n-dodecyl group, a n-tridecyl group, a n-tetradecyl group, a n-pentadecyl group, a n-hexadecyl group, and the like.

Examples of the branched alkyl group having 3 or more and 20 or less carbon atoms include an isopropyl group, an isobutyl group, a sec-butyl group, a tert-butyl group, an isopentyl group, a neopentyl group, a tert-pentyl group, an isohexyl group, a sec-hexyl group, a tert-hexyl group, an isoheptyl group, a sec-heptyl group, a tert-heptyl group, an isooctyl group, a sec-octyl group, a tert-octyl group, an isononyl group, a sec-nonyl group, a tert-nonyl group, an isodecyl group, a sec-decyl group, a tert-decyl group, and the like.

Among the above, as the alkyl group represented by $R^1$ to $R^4$, for example, an alkyl group having 1 or more and 15 or less carbon atoms, such as a methyl group, an ethyl group, a butyl group, or a tetradecyl group, is preferable.

Examples of the aralkyl group represented by $R^1$ to $R^4$ include an aralkyl group having 7 or more and 30 or less carbon atoms.

Examples of the aralkyl group having 7 or more and 30 or less carbon atoms include a benzyl group, a phenylethyl group, a phenylpropyl group, a 4-phenylbutyl group, a phenylpentyl group, a phenylhexyl group, a phenylheptyl group, a phenyloctyl group, a phenylnonyl group, a naphthylmethyl group, a naphthylethyl group, an anthracenylmethyl group, a phenyl-cyclopentylmethyl group, and the like.

Among the above, as the aralkyl group represented by $R^1$ to $R^4$, for example, an aralkyl group having 7 or more and 15 or less carbon atoms, such as a benzyl group, a phenylethyl group, a phenylpropyl group, or a 4-phenylbutyl group, is preferable.

Examples of the aryl group represented by $R^1$ to $R^4$ include an aryl group having 6 or more and 20 or less carbon atoms.

Examples of the aryl group having 6 to 20 carbon atoms include a phenyl group, a pyridyl group, a naphthyl group, and the like.

Among the above, as the aryl group represented by $R^1$ to $R^4$, for example, an aryl group having 6 or more and 10 or less carbon atoms, such as a phenyl group, is preferable.

Examples of the anion represented by $X^-$ include an organic anion and an inorganic anion.

Examples of the organic anion include a polyfluoroalkylsulfonate ion, a polyfluoroalkylcarboxylate ion, a tetraphenylborate ion, an aromatic carboxylate ion, an aromatic sulfonate ion (such as a 1-naphthol-4-sulfonate ion), and the like.

Examples of the inorganic anion include $OH^-$, $F^-$, $Fe(CN)_6^{3-}$, $Cl^-$, $Br^-$, $NO_2^-$, $NO_3^-$, $CO_3^{2-}$, $PO_4^{3-}$, $SO_4^{2-}$, and the like.

In General Formula (AM), two or more of $R^1$, $R^2$, $R^3$, and $R^4$ may be linked to each other to form a ring. Examples of the ring formed of two or more of $R^1$, $R^2$, $R^3$, and $R^4$ linked to each other include an alicyclic ring having 2 or more and 20 or less carbon atoms, a heterocyclic amine having 2 or more and 20 or less carbon atoms, and the like.

In the compound represented by General Formula (AM), $R^1$, $R^2$, $R^3$, and $R^4$ may each independently have a substituent. Examples of the substituent include a nitrile group, a carbonyl group, an ether group, an amide group, a siloxane group, a silyl group, an alkoxysilane group, and the like.

It is preferable that $R^1$, $R^2$, $R^3$, and $R^4$ each independently represent, for example, an alkyl group having 1 or more and 16 or less carbon atoms, an aralkyl group having 7 or more and 10 or less carbon atoms, or an aryl group having 6 or more and 20 or less carbon atoms.

Among these, from the viewpoint of charge distribution narrowing, the total number of carbon atoms in the compound represented by General Formula (AM) is, for example, preferably 18 or more and 35 or less, and more preferably 20 or more and 32 or less.

Examples of structures other than $X^-$ in the compound represented by General Formula (AM) will be shown below, but the present exemplary embodiment is not limited thereto.

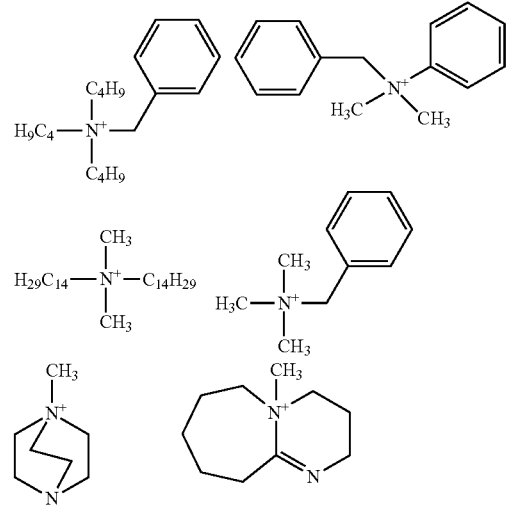

From the viewpoint of charge distribution narrowing, the quaternary ammonium salt containing a molybdenum element is, for example, preferably a compound represented by General Formula (AM) in which $X^-$ represents a molybdate ion (such as $MoO_4^{2-}$, $Mo_2O_7^{2-}$, $Mo_3O_{10}^{2-}$, $Mo_4O_{13}^{2-}$, $Mo_7O_{24}^{2-}$ or $Mo_8O_{26}^{4-}$) as an anion. Specifically, examples of the quaternary ammonium salt containing molybdenum element include $[N^+(CH_3)(C_{14}C_{29})_2]_4Mo_8O_{28}^{4-}$, $[N^+(C_4H_9)_2(C_6H_6)_2]_2Mo_2O_7^{2-}$, $[N^+(CH_3)_2(CH_2C_6H_6)(CH_2)_{17}CH_3]_2MoO_4^{2-}$, $[N^+(CH_3)_2(CH_2C_6H_6)(CH_2)_{15}CH_3]_2 MoO_4^{2-}$, and the like.

Examples of the metal oxide containing a molybdenum element include a molybdenum oxide (molybdenum trioxide, molybdenum dioxide, or $Mo_9O_{26}$), a molybdic acid alkali metal salt (such as lithium molybdate, sodium molybdate, or potassium molybdate), a molybdenum alkaline earth metal salt (such as magnesium molybdate or calcium molybdate) and other composite oxides (such as $Bi_2O_3 \cdot 2MoO_3$ or $\gamma\text{-}Ce_2Mo_3O_{13}$).

Detection and Content of Nitrogen Element-Containing Compound

In a case where the silica particles according to the present exemplary embodiment are heated at a temperature in a range of 300° C. or higher and 600° C. or lower, a nitrogen element-containing compound is detected. Specifically, for example, the compound is detected as follows.

For detecting the nitrogen element-containing compound, for example, a heating furnace-type drop-type pyrolysis gas chromatograph mass spectrometer using He as a carrier gas is used. The nitrogen element-containing compound can be detected in an inert gas under the condition of a pyrolysis temperature of 300° C. or higher and 600° C. or lower. Specifically, by introducing silica particles in an amount of 0.1 mg or more and 10 mg or less into a pyrolysis gas chromatograph mass spectrometer, it is possible to check whether or not the silica particles contain a nitrogen element-containing compound from the MS spectrum of the detected peak. Examples of components generated by pyrolysis from the silica particles containing a nitrogen element-containing compound include an amine represented by General Formula (N) having one or more and three or less C—N bonds and an aromatic nitrogen compound.

In General Formula (N), $R^{N1}$ to $R^{N3}$ each independently represent a hydrogen atom or an alkyl, aralkyl, or aryl group which may have a substituent. $R^{N1}$ to $R^{N3}$ have the same definition as $R^1$, $R^2$, and $R^3$ in General Formula (AM).

For example, in a case where the nitrogen element-containing compound is a quaternary ammonium salt, some of the side chains thereof are detached by pyrolysis at 600° C., and the compound is detected as a tertiary amine.

General Formula (N)

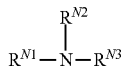

From the viewpoint of charge distribution narrowing, the content of the nitrogen element-containing compound with respect to the amount of silica particles is, for example, preferably 0.008% by mass or more and 0.45% by mass or less, more preferably 0.015% by mass or more and 0.20% by mass or less, and even more preferably 0.018% by mass or more and 0.10% by mass or less, in terms of N atoms.

The content of the nitrogen element-containing compound in terms of N atoms is measured as follows.

By using an oxygen·nitrogen analyzer (for example, EMGA-920 manufactured by HORIBA, Ltd.), a sample is measured for a total of 45 seconds, thereby obtaining the abundance of a nitrogen element as a ratio of N (N/Si). As a pretreatment, the sample is dried in a vacuum dryer for 24 hours or more at 100° C. so that impurities such as ammonia are removed from the silica particles.

Extraction Amount of Nitrogen Element-Containing Compound

An extraction amount X of the nitrogen element-containing compound by a mixed solution of ammonia/methanol is, for example, 0.1% by mass or more. It is preferable that the extraction amount X of the nitrogen element-containing compound and an extraction amount Y of the nitrogen element-containing compound by water satisfy, for example, Expression: Y/X<0.3.

That is, a nitrogen element-containing compound tends to be poorly soluble in water, that is, is difficult to adsorb moisture in the air.

In the silica particles containing a nitrogen element-containing compound, in a case where the nitrogen element-containing compound adsorbs moisture, the charge distribution widens, and the nitrogen element-containing compound is easily detached from the silica particles.

However, the silica particles containing a nitrogen element-containing compound is difficult to adsorb moisture in the air are unlikely to have a wider charge distribution even though there is a large amount of moisture in the air (even under high humidity) and unlikely to experience the detachment of the nitrogen element-containing compound, and easily retain a narrow charge distribution.

The extraction amount X of the nitrogen element-containing compound is, for example, preferably 50% by mass. Here, the upper limit of the extraction amount X of the nitrogen element-containing compound is, for example, 95% by mass or less, because it is difficult for a solution to permeate the pores due to surface tension and thus a part of the nitrogen element-containing compound remains undissolved.

The ratio "Y/X" of the extraction amount Y of the nitrogen element-containing compound to the extraction amount X of the nitrogen element-containing compound is, for example, preferably less than 0.3. Here, ideally, the lower limit of the ratio "Y/X" is 0. However, because measurement error in a range of about ±1% occurs for X and Y, the lower limit is, for example, 0.01 or more.

Herein, the extraction amounts X and Y of the nitrogen element-containing compound are measured as follows.

First, the silica particles to be measured are analyzed with a thermogravimetric analyzer (for example, a gas chromatograph mass spectrometer manufactured by Netch Japan Co., Ltd.) at a constant temperature of 400° C., the mass fractions of compounds in which a hydrocarbon having at least one or more carbon atoms forms a covalent bond with a nitrogen element to the silica particles are added up and adopted as W1.

On the other hand, 1 part by mass of the silica particles to be measured are added to 30 parts by mass of an ammonia/methanol solution (manufactured by Sigma-Aldrich Co., LLC, mass ratio of ammonia/methanol=1/5.2) at a liquid temperature of 25° C. and treated with ultrasonic waves for 30 minutes, and then silica powder and an extract are separated. The separated silica particles are dried in a vacuum dryer at 100° C. for 24 hours. Then, by using a thermogravimetric analyzer, the mass fractions of compounds in which a hydrocarbon having at least one or more carbon atoms forms a covalent bond with a nitrogen atom to the silica particles are measured at a constant temperature of 400° C. and adopted as W2.

Thereafter, the extraction amount X of the nitrogen element-containing compound is calculated by the following equation.

$$X = W1 - W2 \quad \text{Equation:}$$

Furthermore, 1 part by mass of the silica particles to be measured are added to 30 parts by mass of water having a liquid temperature of 25° C. and treated with ultrasonic waves for 30 minutes, and then the silica particles and an extract are separated. The separated silica particles are dried in a vacuum dryer at 100° C. for 24 hours. Then, by using a thermogravimetric analyzer, the mass fractions of compounds in which a hydrocarbon having at least one or more carbon atoms forms a covalent bond with a nitrogen atom to the silica particles are measured at a constant temperature of 400° C. and adopted as W3.

Thereafter, the extraction amount Y of the nitrogen element-containing compound is calculated by the following equation.

$$Y = W1 - W3 \quad \text{Equation:}$$

Hydrophobized Structure

The hydrophobized structure is a structure that has had a reaction with a hydrophobing agent.

As the hydrophobing agent, for example, an organosilicon compound is used.

Examples of the organosilicon compound include an alkoxysilane compound or a halosilane compound having a lower alkyl group, such as methyltrimethoxysilane, dimethyldimethoxysilane, trimethylchlorosilane, or trimethylmethoxysilane; an alkoxysilane compound having a vinyl group, such as vinyltrimethoxysilane or vinyltriethoxysilane;

an alkoxysilane compound having an epoxy group, such as 2-(3,4-epoxycyclohexyl)ethyltrimethoxysilane, 3-glycidoxypropylmethyldimethoxysilane, 3-glycidoxypropyltrimethoxysilane, 3-glycidoxypropylmethyldiethoxysilane, or 3-glycidoxypropyltriethoxysilane;

an alkoxysilane compound having a styryl group, such as p-styryltrimethoxysilane or p-styryltriethoxysilane;

an alkoxysilane compound having an aminoalkyl group, such as N-2-(aminoethyl)-3-aminopropylmethyldimethoxysilane, N-2-(aminoethyl)-3-aminopropyltrimethoxysilane, 3-aminopropyltrimethoxysilane, 3-aminopropyltriethoxysilane, 3-triethoxysilyl-N-(1,3-dimethyl-butylidene)propylamine, or N-phenyl-3-aminopropyltrimethoxysilane;

an alkoxysilane compound having an isocyanate alkyl group, such as 3-isocyanatepropyltrimethoxysilane or 3-isocyanatepropyltriethoxysilane;

a silazane compounds such as hexamethyldisilazane or tetramethyldisilazane;

and the like.

Characteristics of Silica Particles

Degree of Hydrophobicity

From the viewpoint of charge distribution narrowing, a degree of hydrophobicity of the silica particles according to the present exemplary embodiment is, for example, preferably 10% or more and 60% or less, more preferably 20% or more and 55% or less, and even more preferably 28% or more and 53% or less.

In a case where the degree of hydrophobicity of the silica particles is 10% or less, the silica particles are covered with a small amount of the structure due to the reaction caused by the silane coupling agent, and the content of the nitrogen element-containing compound is reduced. As a result, the charge distribution easily widens.

On the other hand, in a case where the degree of hydrophobicity of the silica particles is higher than 60%, the density of the structure increases due to the reaction caused by the silane coupling agent, the number of pores decreases, and the content of the nitrogen element-containing compound is reduced. Therefore, the charge distribution easily widens.

The degree of hydrophobicity of the silica particles is measured as follows.

As a sample, 0.2% by mass of silica particles are added to 50 ml of deionized water. While the mixture is being stirred with a magnetic stirrer, methanol is added dropwise thereto from a burette, and the mass fraction of methanol in the mixed solution of methanol/water at a point in time when the entirety of the sample is precipitated is determined and adopted as a degree of hydrophobicity.

Number Average Particle Size and Number-Based Particle Size Distribution Index

The number average particle size of the silica particles according to the present exemplary embodiment is, for example, preferably 10 nm or more and 200 nm or less, more preferably 10 nm or more and 80 nm or less, and even more preferably 10 nm or more and 60 nm or less.

In a case where the number average particle size of silica particles is in the above range, the silica particles have a large specific surface area and are likely to be excessively charged. However, the silica particles according to the present exemplary embodiment can narrow the charge distribution even though the number average particle size thereof is in the above range.

The number-based particle size distribution index of the silica particles according to the present exemplary embodiment is, for example, preferably 1.1 or more and 2.0 or less, and more preferably 1.15 or more and 1.6 or less.

In a case where the number-based particle size distribution index of the silica particles according to the present exemplary embodiment is in the above range, the amount of coarse powder that tends to carry a large amount of charge and the amount of fine powder that tends to carry a small amount of charge are reduced, which makes it easy to narrow the charge distribution.

The number average particle size and the number-based particle size distribution index of the silica particles are measured as follows.

The silica particles are observed with a scanning electron microscope (SEM) at 40,000× magnification, the image of the observed silica particles is analyzed with image processing/analyzing software WinRoof (manufactured by MITANI Corporation.), and equivalent circular diameters of at least 200 particles are calculated. Then, for the number of individual particles, a cumulative distribution is drawn from the number of small size particles, and a particle size below which the cumulative percentage of particles smaller than this size reaches 50% is determined as a number average particle size.

Furthermore, a square root of D84/D16 is defined as "number-based particle size distribution index" (GSD), wherein D84 is a particle size below which the cumulative percentage of particles smaller than this size reaches 84%, and D16 is a particle size below which the cumulative percentage of particles smaller than this size reaches 16%. That is, the number-based particle size distribution index $(GSD) = (D84/D16)^{0.5}$.

Circularity

The average circularity of the silica particles according to the present exemplary embodiment is, for example, preferably 0.60 or more and 0.96 or less, more preferably 0.70 or more and 0.92 or less, and even more preferably 0.75 or more and 0.90 or less.

In a case where the average circularity of silica particles is in the above range, the silica particles have a large specific surface area and are likely to be excessively charged. However, the silica particles according to the present exemplary embodiment can narrow the charge distribution even though the average circularity thereof is in the above range.

The circularity of silica particles is measured as follows.

Silica particles are observed with a scanning electron microscope (SEM) at 40,000× magnification, the image of the observed silica particles is analyzed with image processing/analyzing software WinRoof (manufactured by MITANI Corporation.), the circularity of at least 200 particles is calculated, and an arithmetic mean thereof is calculated and adopted as the average circularity.

The circularity is calculated by the following equation.

Circularity=Perimeter as equivalent circular diameter/Perimeter=$[2\times(A\pi)^{1/2}]/PM$ In the above equation, A represents a projected area, and PM represents a perimeter.

Volume Resistivity

The volume resistivity of the silica particles according to the present exemplary embodiment (that is, the volume resistivity before baking at 350° C.) is, for example, preferably $1.0\times10^7$ Ωcm or more and $1.0\times10^{11.5}$ Ωcm or less, and more preferably $1.0\times10^8$ Ωcm or more and $1.0\times10^{11}$ Ωcm or less.

In a case where the volume resistivity of the silica particles according to the present exemplary embodiment is in the above range, the silica particles contain a large amount of nitrogen element-containing compound and are unlikely to be excessively charged, which makes it easy to narrow the charge distribution.

In the silica particles according to the present exemplary embodiment, in a case where Ra represents a volume resistivity of the silica particles before baking at 350° C., and Rb represents a volume resistivity of the silica particles after baking at 350° C., Ra/Rb is, for example, preferably 0.01 or more and 0.8 or less, and more preferably 0.015 or more and 0.6 or less.

In a case where Ra/Rb is in the above range, the silica particles contain a large amount of nitrogen element-containing compound and are unlikely to be excessively charged, which makes it easy to narrow the charge distribution.

Baking at 350° C. is carried out as described above.

On the other hand, the volume resistivity is measured as follows. The volume resistivity is measured in an environment at a temperature of 20° C. and a humidity of 50% RH.

Silica particles to be measured are placed on the surface of a circular jig on which a 20 cm$^2$ electrode plate is disposed, so that a silica particle layer having a thickness of about 1 mm or more and 3 mm or less is formed. The same 20 cm$^2$ electrode plate as described above is placed on the silica particle layer so that the silica particle layer is sandwiched between the electrode plates. In order to eliminate voids between the silica particles, a pressure of 0.4 MPa is applied on the electrode plate placed on the silica particle layer, and then the thickness (cm) of the silica particle layer is measured. Both the electrodes placed on and under the silica particle layer are connected to an impedance analyzer (I manufactured by Solartron Analytical). Resistance is measured at a frequency of $10^{-3}$ Hz or more and $10^6$ Hz or less, thereby obtaining a Nyquist plot. On the assumption that there are three resistance components, bulk resistance, particle interface resistance, and electrode contact resistance, the plot is fitted to an equivalent circuit, and a bulk resistance R is determined.

The volume resistivity of silica particles (Ω·cm) is calculated by the following equation.

$$\rho = R/L \qquad \text{Equation:}$$

In the equation, ρ represents volume resistivity (Ω·cm) of silica particles, R represents bulk resistance (Ω), and L represents the thickness (cm) of the silica particle layer.

Amount of OH Groups

In the silica particles according to the present exemplary embodiment, the amount of OH groups measured by the Sears method is, for example, preferably 0.2 OH groups/nm$^2$ or more and 5.5 OH groups/nm$^2$ or less. From the viewpoint of charge distribution narrowing, the amount of OH group is, for example, more preferably 0.2 OH groups/nm$^2$ or more and 4 OH groups/nm$^2$ or less, and even more preferably 0.2 OH groups/nm$^2$ or more and 3 OH groups/nm$^2$ or less.

In a case where the structure configured with the reaction product of a silane coupling agent is sufficiently formed on the silica base particles, the amount of OH groups measured by the Sears method can be adjusted and fall into the above range.

In a case where the amount of OH groups that inhibit the adsorption of the nitrogen element-containing compound is reduced and falls into the above range, the nitrogen element-containing compound can easily permeate deep into the pores of the silica particles (for example, the pores of the adsorption layer which will be described later). Furthermore, the hydrophobic interaction with the nitrogen element-containing compound works, and the adhesion of this compound to the silica particles becomes stronger. Therefore, the amount of the nitrogen element-containing compound adsorbed increases. In addition, the nitrogen element-containing compound is less likely to be detached. As a result, due to the nitrogen element-containing compound, the charge distribution is further narrowed, and the retentivity of the narrow charge distribution is further improved.

Furthermore, in a case where the amount of OH groups is reduced and falls into the above range, the environmental dependence of the charging characteristics is reduced. Therefore, in any environment (particularly, in a low-temperature and low-humidity environment where the silica particles are likely to carry an excess of negative charge), the charge distribution can be easily narrowed by the nitrogen element-containing compound.

The amount of OH groups is measured by the Sears method. Specifically, the method is as follows.

Silica particles (1.5 g) are added to a mixed solution of 50 g of pure water and 50 g of ethanol, and the mixture is stirred with an ultrasonic homogenizer for 2 minutes, thereby preparing a dispersion. While the dispersion is being stirred in an environment at 25° C., 1.0 g of a 0.1 mol/L aqueous hydrochloric acid solution is added dropwise thereto, thereby obtaining a test liquid. The obtained test liquid is put in an automatic titration device, potentiometric titration using a 0.01 mol/L aqueous sodium hydroxide solution is performed, and a differential curve of the titration curve is created. In the inflection point where the differential value of the titration curve is 1.8 or more, the titration amount by which the titration amount of the 0.01 mol/L aqueous sodium hydroxide solution is maximized is denoted by E.

The surface silanol group density ρ (number of silanol groups/nm$^2$) of the silica particles is calculated using the following equation.

$$\rho = ((0.01\times E - 0.1)\times NA/1{,}000)/(M\times S_{BET}\times 10^{18}) \qquad \text{Equation:}$$

Details of the symbols in the equation are as follows.

E: titration amount by which the titration amount of the 0.01 mol/L aqueous sodium hydroxide solution is maximized in the inflection point where the differential value of the titration curve is 1.8 or more.

NA: Avogadro's number

M: Amount of silica particles (1.5 g)

$S_{BET}$: Specific surface area of silica particles (m$^2$/g)

The specific surface area of the silica particles is measured by the three-point BET nitrogen adsorption method. The relative equilibrium pressure is 0.3.

Manufacturing Method of Silica Particles

An example of the manufacturing method of the silica particles according to the present exemplary embodiment has a first step of forming a structure configured with a reaction product of a silane coupling agent on at least a part of surface of silica base particles, and a second step of causing a nitrogen element-containing compound to be adsorbed onto at least a part of pores of the reaction product of a silane coupling agent.

The manufacturing method of the silica particles according to the present exemplary embodiment may further have a third step of hydrophobizing the silica base particles having a structure which covers at least a part of surface of the silica base particles and is configured with the reaction product of a silane coupling agent, and in which the nitrogen element-containing compound is adsorbed onto at least a part of pores of the reaction product of a silane coupling agent, after or during the second step.

Hereinafter, the steps of the manufacturing method of the silica particles according to the present exemplary embodiment will be specifically described.

Preparation Step

First, a step of preparing silica base particles will be described.

Examples of the reparation step include (i) step of mixing an alcohol-containing solvent with silica base particles so as to prepare a silica base particle suspension, (ii) step of granulating silica base particles by a sol-gel method so as to obtain a silica base particle suspension, and the like.

Examples of the silica base particles used in (i) include sol-gel silica particles (silica particles obtained by a sol-gel method), aqueous colloidal silica particles, alcoholic silica particles, fumed silica particles obtained by a gas phase method, molten silica particles, and the like.

The alcohol-containing solvent used in (i) may be a solvent composed only of an alcohol or a mixed solvent of an alcohol and other solvents. Examples of the alcohol include lower alcohols such as methanol, ethanol, n-propanol, isopropanol, and butanol. Examples of other solvents include water; ketones such as acetone, methyl ethyl ketone, and methyl isobutyl ketone; cellosolves such as methyl cellosolve, ethyl cellosolve, butyl cellosolve, and cellosolve acetate; ethers such as dioxane and tetrahydrofuran; and the like. In the case of the mixed solvent, for example, the proportion of the alcohol is, for example, preferably 80% by mass or more, and more preferably 85% by mass or more.

A step (1-a) is preferably, for example, a step of granulating silica base particles by a sol-gel method so as to obtain a silica base particle suspension.

More specifically, the step (1-a) is, for example, preferably a sol-gel method including an alkali catalyst solution preparation step of preparing an alkali catalyst solution composed of an alcohol-containing solvent containing an alkali catalyst and a silica base particle generation step of supplying tetraalkoxysilane and an alkali catalyst to the alkali catalyst solution so as to generate silica base particles.

The alkali catalyst solution preparation step is, for example, preferably a step of preparing an alcohol-containing solvent and mixing the solvent with an alkali catalyst so as to obtain an alkali catalyst solution.

The alcohol-containing solvent may be a solvent composed only of an alcohol or a mixed solvent of an alcohol and other solvents. Examples of the alcohol include lower alcohols such as methanol, ethanol, n-propanol, isopropanol, and butanol. Examples of other solvents include water; ketones such as acetone, methyl ethyl ketone, and methyl isobutyl ketone; cellosolves such as methyl cellosolve, ethyl cellosolve, butyl cellosolve, and cellosolve acetate; ethers such as dioxane and tetrahydrofuran; and the like. In the case of the mixed solvent, the proportion of the alcohol is, for example, preferably 80% by mass or more, and more preferably 85% by mass or more.

The alkali catalyst is a catalyst for accelerating the reaction of tetraalkoxysilane (a hydrolysis reaction and a condensation reaction). Examples thereof include basic catalysts such as ammonia, urea, and monoamine. Among these, for example, ammonia is particularly preferable.

The concentration of the alkali catalyst in the alkali catalyst solution is, for example, preferably 0.5 mol/L or more and 1.5 mol/L or less, more preferably 0.6 mol/L or more and 1.2 mol/L or less, and even more preferably 0.65 mol/L or more and 1.1 mol/L or less.

The silica base particle generation step is a step of supplying tetraalkoxysilane and an alkali catalyst to the alkali catalyst solution and reacting the tetraalkoxysilane (a hydrolysis reaction and condensation reaction) in the alkali catalyst solution so as to generate silica base particles.

In the silica base particle generation step, core particles are generated by the reaction of the tetraalkoxysilane at the early stage of supplying tetraalkoxysilane (core particle generation stage), and then silica base particles are generated through the growth of the core particles (core particle growth stage).

Examples of the tetraalkoxysilane include tetramethoxysilane, tetraethoxysilane, tetrapropoxysilane, tetrabutoxysilane, and the like. From the viewpoint of controlling the reaction rate or uniformity of the shape of the silica base particles to be generated, for example, tetramethoxysilane or tetraethoxysilane is preferable.

Examples of the alkali catalyst supplied to the alkali catalyst solution include basic catalysts such as ammonia, urea, monoamine, and a quaternary ammonium salt. Among these, for example, ammonia is particularly preferable. The alkali catalyst supplied together with the tetraalkoxysilane may, for example, be of the same type as or different type from the alkali catalyst contained in the alkali catalyst solution in advance. For example, it is preferable that the alkali catalysts be of the same type.

The method for supplying the tetraalkoxysilane and the alkali catalyst to the alkali catalyst solution may be a continuous supply method or an intermittent supply method.

In the silica base particle generation step, the temperature of the alkali catalyst solution (temperature at the time of supply) is, for example, preferably 5° C. or higher and 50° C. or lower, and more preferably 15° C. or higher and 45° C. or lower.

First Step

In the first step, a structure configured with a reaction product of a silane coupling agent is formed.

Specifically, in the first step, for example, a silane coupling agent is added to the silica base particle suspension, the silane coupling agent is reacted on the surface of the silica base particles so that the structure configured with a reaction product of the silane coupling agent is formed. The functional groups of the silane coupling agent react with one another and with the OH groups on the surface of the silica particles. As a result, the structure configured with a reaction product of the silane coupling agent is formed.

The reaction of the silane coupling agent is carried out by adding the silane coupling agent to the silica base particle suspension and then heating the suspension with stirring.

Specifically, for example, the suspension is heated to a temperature of 40° C. or higher and 70° C. or lower, a silane coupling agent is added thereto, and then the mixture is stirred. The stirring is continued, for example, preferably for 10 minutes or more and 24 hours or less, more preferably for 60 minutes or more and 420 minutes or less, and even more preferably 80 minutes or more and 300 minutes or less.

Second Step

In the second step, a nitrogen element-containing compound is adsorbed onto at least a part of pores of the reaction product of a silane coupling agent.

Specifically, in the second step, first, for example, a nitrogen element-containing compound is added to the silica base particle suspension, and the mixture is stirred, for example, in a temperature range of 20° C. or higher and 50° C. or lower. In this way, the nitrogen element-containing compound is adsorbed onto at least a part of the pores of the reaction product of a silane coupling agent.

In the second step, for example, an alcohol solution containing a nitrogen element-containing compound may be added to the silica particle suspension.

The alcohol may, for example, be of the same type as or different type from the alcohol contained in the silica base particle suspension. For example, it is preferable that the alcohols be of the same type.

In the alcohol solution containing the nitrogen element-containing compound, for example, the concentration of the nitrogen element-containing compound is preferably 0.05% by mass or more and 10% by mass or less, and more preferably 0.1% by mass or more and 6% by mass or less.

Third Step

In the third step, after the second step or during the second step, the silica base particles having a structure in which the nitrogen element-containing compound is adsorbed onto at least a part of the pores of the reaction product of a silane coupling agent are hydrophobized.

Specifically, in the third step, for example, a nitrogen element-containing compound is added to the silica base particle suspension in which the aforementioned structure is formed, and then a hydrophobing agent is added thereto.

The functional groups of the hydrophobing agent react with one another and with the OH groups of the silica base particles, thereby forming a hydrophobic layer.

The reaction of the hydrophobing agent is carried out by adding the silane coupling agent to the silica base particle suspension and then heating the suspension with stirring.

Specifically, for example, the suspension is heated to a temperature of 40° C. or higher and 70° C. or lower, a hydrophobing agent is added thereto, and then the mixture is stirred. The stirring is continued, for example, preferably for 10 minutes or more and 24 hours or less, more preferably for 20 minutes or more and 120 minutes or less, and even more preferably 20 minutes or more and 90 minutes or less.

Drying Step

In the manufacturing method of the silica particles according to the present exemplary embodiment, for example, it is preferable that a drying step of removing a solvent from the suspension be performed after the second step or the third step. The drying step may be carried out during the second step or third step.

Examples of the drying include heat drying, spray drying, and supercritical drying.

Spray drying can be performed by a conventionally known method using a commercially available spray dryer (including a rotary disk type and a nozzle type). For example, spray drying is performed by spraying a spray liquid in a hot air stream at a rate of 0.2 L/hour or more and 1 L/hour or less. At this time, the temperature of hot air is set so that, for example, the inlet temperature is preferably in a range of 70° C. or higher and 400° C. or lower and the outlet temperature is preferably in a range of 40° C. or higher and 120° C. or lower. In a case where the inlet temperature is lower than 70° C., the solids contained in the dispersion are not fully dried. In a case where the inlet temperature is higher than 400° C., the particle shape is distorted during the spray drying. Furthermore, in a case where the outlet temperature is lower than 40° C., the degree of drying of the solids is poor, and the solids adhere to the inside of the device. The inlet temperature is, for example, more preferably in a range of 100° C. or higher and 300° C. or lower.

The silica particle concentration in the silica particle suspension during the spray drying is, for example, preferably in a range of 10% by mass or more and 30% by mass or less in terms of solids.

During the supercritical drying, solvents are removed with a supercritical fluid. Therefore, surface tension between particles is difficult to work, and the primary particles contained in the suspension are dried while being inhibited from causing aggregation. Therefore, it is easy to obtain silica particles having a more uniform particle size.

Examples of the substance used as the supercritical fluid include carbon dioxide, water, methanol, ethanol, acetone, and the like. From the viewpoint of treatment efficiency and from the viewpoint of inhibiting the occurrence of coarse particles, it is preferable that the solvent removing step, for example, be a step of using supercritical carbon dioxide.

Specifically, the supercritical drying is performed by, for example, the following operation.

The suspension is put in an airtight reactor, and then liquefied carbon dioxide is introduced into the reactor. Thereafter, the airtight reactor is heated, and the internal pressure of the airtight reactor is raised using a high-pressure pump so that the carbon dioxide in the airtight reactor is in a supercritical state. Then, the liquefied carbon dioxide is caused to flow into the airtight reactor, and the supercritical carbon dioxide is discharged from the airtight reactor, so that the supercritical carbon dioxide circulates in the suspension in the airtight reactor. While the supercritical carbon dioxide is circulating in the suspension, the solvent dissolves in the supercritical carbon dioxide and is removed along with the supercritical carbon dioxide discharged from the airtight reactor.

The internal temperature and pressure of the airtight reactor are set so that the carbon dioxide is in a supercritical state. Because the critical point of carbon dioxide is 31.1° C./7.38 MPa, for example, the temperature is set to 40° C. or higher and 200° C. or lower, and the pressure is set to 10 MPa or higher and 30 MPa or lower.

The flow rate of the supercritical fluid in supercritical drying is, for example, preferably 80 mL/sec or more and 240 mL/sec or less.

It is preferable that the obtained silica particles, for example, be disintegrated or sieved as necessary so that coarse particles and aggregates are removed. The silica particles are disintegrated, for example, by a dry pulverizer such as a jet mill, a vibration mill, a ball mill, or a pin mill. The silica particles are sieved, for example, by a vibration sieve, an air sieve, or the like.

EXAMPLES

Hereinafter, exemplary embodiments of the invention will be specifically described based on examples. However, the exemplary embodiments of the invention are not limited to the examples. In the following description, unless otherwise specified, "%" are based on mass in all cases.
Manufacturing of Silica Particles

Examples 1, 3 to 33, and 35 and Reference Examples 1 to 9

Suspensions containing silica particles of each example are prepared in the following manner.
Preparation of Alkali Catalyst Solution Methanol, deionized water, and aqueous ammonia ($NH_4OH$) in the amounts and concentrations shown in Table 1 are put into a glass reactor equipped with a metal stirring rod, a dropping nozzle, and a thermometer, and stirred and mixed together, thereby obtaining an alkali catalyst solution.
Granulation of Silica Base Particles by Sol-Gel Method The temperature of the alkali catalyst solution is adjusted to 40° C., and the alkali catalyst solution is subjected to nitrogen purging. Then, while the alkali catalyst solution is being stirred, tetramethoxysilane (TMOS) in the amount shown in Table 1 and 124 parts by mass of aqueous ammonia ($NH_4OH$) having a catalyst ($NH_3$) concentration of 7.9% are simultaneously added dropwise to the solution, thereby obtaining a silica base particle suspension.
Addition of Silane Coupling Agent While the silica base particle suspension is being heated at 40° C. and stirred, the silane coupling agent of the type and amount shown in Table 1 is added to the suspension. Then, the solution is kept stirred for 120 minutes so that the silane coupling agent reacts. In this way, an adsorptive structure is formed.
Addition of Nitrogen Element-Containing Compound The nitrogen element-containing compound of the type shown in Table 1 is diluted with butanol, thereby preparing an alcohol solution.

Then, the alcohol solution obtained by diluting the nitrogen element-containing compound with butanol is added to the suspension. At this time, the alcohol solution is added so that the number of parts of the nitrogen element-containing compound is as shown in Table 1 with respect to 100 parts by mass of the solids of the silica base particle suspension. Thereafter, the mixture is stirred at 30° C. for 100 minutes, thereby obtaining a suspension containing a nitrogen element-containing compound.
Drying Subsequently, 300 parts by mass of the suspension is put in a reaction vessel, $CO_2$ is added with stirring, and the internal temperature and pressure of the reaction vessel are raised to the temperature and pressure shown in Table 1. In a state where the suspension is being stirred at the temperature and pressure kept as they are, $CO_2$ is caused to flow in and out of the reaction vessel at a flow rate of 5 L/min. Then, the solvent is removed for 120 minutes, thereby obtaining silica particles of each example.

Example 2

Silica particles are obtained in the same manner as in Example 1, except that spray drying is performed using a mini spray dryer B-290 (manufactured by NIHON BUCHI K.K.) under the condition where the silica particle suspension is fed at a liquid feeding rate of 0.2 L/hour, by setting the internal temperature and pressure of the cylinder as shown in Table 1.

Example 33

Silica particles are obtained in the same manner as in Example 1, except that after the addition of the nitrogen element-containing compound, hexamethyldisilazane (HMDS) is added in an amount of 30% by mass with respect to the solids of the silica base particles, and the mixture is stirred at 65° C. for 3 hours so that the surface of the silica base particles is hydrophobized.

Example 34

Silica particles are obtained in the same manner as in Example 1, except that 30 g of dry silica AEROSIL 130 (manufactured by Nippon Aerosil Co., Ltd.) is dispersed as silica base particles in 300 g of methanol so that a silica base particle suspension is obtained.

Comparative Examples 1, 2, and 3

Silica particles are obtained in the same manner as in Example 1, except that the amounts of the silane coupling agent and nitrogen element-containing compound added are set as shown in Table 1.
Evaluation
Various Characteristics The following characteristics of the obtained silica particles are measured according to the method described above.
  Net intensity of molybdenum element (described as "Mo" in the table)
  Ratio of Net intensity of molybdenum element to Net intensity of silicon element (described as "Mo/Si" in the table)
  Number average particle size (described as "particle size" in the table)
  Number-based particle size distribution index (described as "GSD" in the table)
  Average circularity (described as "circularity" in the table)
  Pore volume A of pores having a diameter of 1 nm or more and 50 nm or less determined from a pore size distribution curve obtained by a nitrogen adsorption method before baking at 350° C. (described as "Before baking at 350° C.·Pore volume A" in the table).
  Pore volume B of pores having a diameter of 1 nm or more and 50 nm or less determined from a pore size distribution curve obtained by a nitrogen adsorption method after baking at 350° C. (described as "After baking at 350° C.·Pore volume B" in the table).
  Volume resistivity Ra before baking at 350° C. (described as "Volume resistivity Ra before baking" in the table)

Volume resistivity Rb after baking at 350° C. (described as "Volume resistivity Rb after baking" in the table)

Amount of OH groups measured by the Sears method (described as "OH group amount" in the table)

Ratio of integral value C of signals observed in a range of chemical shift of −50 ppm or more and −75 ppm or less in a case where the integral value of all signals in Si—CP/MAS NMR spectrum is regarded as 100% (described as "Si—CP/MAS Area ratio C" in the table).

Ratio C/D of C as an integral value of signals observed in a range of chemical shift of −50 ppm or more and −75 ppm or less in a Si—CP/MAS NMR spectrum to D as an integral value of signals observed in a range of chemical shift of −90 ppm or more and −120 ppm or less in the same spectrum (described as "Si—CP/MAS·Ratio C/D" in the table).

Degree of Hydrophobicity

Charge Amount at Low Humidity, Charge Amount at High Humidity, and Environmental Dependence of Capacitance For silica particles of each example, the charge amount at a low humidity and the charge amount at a high humidity are measured as follows, and the environmental dependence of capacitance is evaluated. Among the criteria, A and B are acceptable.

The evaluation method is as follows.

The prepared silica particles (2% by mass) are added to the surface of MA1010 manufactured by Nippon Shokubai Co., Ltd., and 5 g of the obtained resultant is mixed with 50 g of KNI106GSM manufactured by JFE Chemical Corporation. The obtained mixed sample is stirred for 5 minutes in a chamber at 10° C. and 10% RH with a tubular shaker, the charge is measured using TB200 manufactured by TOSHIBA CORPORATION, and the result is denoted by FC. Furthermore, the same sample is stirred for 5 minutes in a chamber at 30° C. and 90% RH with a tubular shaker, the charge is measured using TB200 manufactured by TOSHIBA CORPORATION, and the result is denoted by FA. The environmental dependence of capacitance is evaluated using a ratio of FA/FC.

A (⊚): FA/FC is 0.8 or more and less than 1.1.

B (○): FA/FC is 0.65 or more and less than 0.8.

C (Δ): FA/FC is 0.5 or more and less than 0.65.

D (×): FA/FC is less than 0.5.

Charge Distribution in Low-Temperature and Low-Humidity Environment

The charge distribution of the silica particles of each example in a low-temperature and low-humidity environment (environment at 10° C. and 10% RH) is evaluated as follows.

The prepared silica particles (2% by mass) are added to the surface of MA1010 manufactured by Nippon Shokubai Co., Ltd., and 5 g of the obtained resultant is mixed with 50 g of KNI106GSM manufactured by JFE Chemical Corporation. The obtained mixed sample is stirred for 5 minutes in a chamber at 10° C. and 10% RH with a tubular shaker, and the charge distribution is evaluated by image analysis of CSG (charge spectrography). The charge distribution is defined as a value obtained by dividing the difference between a charge amount Q(20) accounting for an integrated cumulative percentage of 20% in the charge distribution and a charge amount Q(80) accounting for an integrated cumulative percentage of 80% in the charge distribution by a charge amount Q(50) accounting for an integrated cumulative percentage of 50% in the charge distribution. That is, the charge distribution is defined as [Q(80)−Q(20)]/Q(50). The evaluation criteria are as follows.

A (⊚): The value of [Q(80)−Q(20)]/Q(50) is less than 0.7.

B (○): The value of [Q(80)−Q(20)]/Q(50) is less than 0.8 and 0.7 or more.

C (Δ): The value of [Q(80)−Q(20)]/Q(50) is less than 1.0 and 0.8 or more.

D (×): The value of [Q(80)−Q(20)]/Q(50) is 1.0 or more.

Narrow Charge Distribution Retentivity in High-Temperature and High-Humidity Environment The narrow charge distribution retentivity of the silica particles of each example in a high-temperature and high-humidity environment (environment at 30° C. and 90% RH) is evaluated as follows.

The prepared silica particles (2% by mass) are added to the surface of MA1010 manufactured by Nippon Shokubai Co., Ltd., and 5 g of the obtained resultant is mixed with 50 g of KNI106GSM manufactured by JFE Chemical Corporation. The obtained mixed sample is stirred for 100 minutes in a chamber at 30° C. and 90% RH with a tubular shaker, and the charge distribution is evaluated by image analysis of CSG (charge spectrography). The charge distribution is defined as a value obtained by dividing the difference between a charge amount Q(20) accounting for an integrated cumulative percentage of 20% in the charge distribution and a charge amount Q(80) accounting for an integrated cumulative percentage of 80% in the charge distribution by a charge amount Q(50) accounting for an integrated cumulative percentage of 50% in the charge distribution. That is, the charge distribution is defined as [Q(80)−Q(20)]/Q(50). The evaluation criteria are as follows.

A (⊚): The value of [Q(80)−Q(20)]/Q(50) is less than 0.75.

B (○): The value of [Q(80)−Q(20)]/Q(50) is less than 0.85 and 0.75 or more.

C (Δ): The value of [Q(80)−Q(20)]/Q(50) is less than 1.0 and 0.85 or more.

D (×): The value of [Q(80)−Q(20)]/Q(50) is 1.0 or more.

Narrow Charge Distribution Retentivity in Low-Temperature and Low-Humidity Environment The narrow charge distribution retentivity of the silica particles of each example in a low-temperature and low-humidity environment (in an environment at 10° C. and 10% RH) is evaluated in the same manner as in the evaluation of the narrow charge distribution retentivity in a high-temperature and high-humidity environment (in an environment at 30° C. and 90% RH), except that the evaluation is performed in a low-temperature and low-humidity environment (in an environment at 10° C. and 10% RH).

The evaluation results are shown in Table 1.

Details of the abbreviations in Table 1 are as follows.

MTMS: methyltrimethoxysilane

DTMS: n-dodecyltrimethoxysilane

TP-415: [N$^+$(CH$_3$)$_3$(C$_{14}$C$_{29}$)$_2$]$_4$ Mo$_8$O$_{28}$$^{4-}$ (manufactured by Hodogaya Chemical Co., Ltd., N,N-Dimethyl-N-tetradecyl-1-tetradecanaminium, hexa-μ-oxotera-μ3-oxodi-μ5-oxotetradecaoxooctamolybdate (4−) (4:1)) (Extraction amount X by ammonia/methanol mixed solution=61% to 89% by mass, ratio X/Y of extraction amount X to extraction amount Y=0.03 to 0.26)

Dimethylstearyl ammonium chloride (extraction amount X by a mixed solution of ammonia/methanol=75% by mass, ratio X/Y of extraction amount X to extraction amount Y by water=0.28)

Tributylamine (extraction amount X by mixed solution of ammonia/methanol=65% by mass, ratio X/Y of extraction amount X to extraction amount Y by water=0.29)

Dimethyloctadecyl [3-(trimethoxysilyl)propyl] ammonium chloride (extraction amount X by mixed solution of ammonia/methanol=76% by mass, ratio X/Y of extraction amount X to extraction amount Y by water=0.25)

Quotanium-80 (extraction amount X by mixed solution of ammonia/methanol=80% by mass, ratio X/Y of extraction amount X to extraction amount Y by water=0.09)

Ditetrakis(dibutyldibenzylammonium) molybdate (extraction amount X by mixed solution of ammonia/methanol=65% by mass, ratio X/Y of extraction amount X to extraction amount Y by water=0.15)

Phenethylamine (extraction amount X by mixed solution of ammonia/methanol=55% by mass, ratio X/Y of extraction amount X to extraction amount Y by water=0.28)

4-(2-Octylamino)diphenylamine (extraction amount X by mixed solution of ammonia/methanol=78% by mass, ratio X/Y of extraction amount X to extraction amount Y by water=0.14)

N-benzyl-N-methylethanolamine (extraction amount X by mixed solution of ammonia/methanol=58% by mass, ratio X/Y of extraction amount X to extraction amount Y by water=0.27)

2,3-Bis(2,6-diisopropylphenylimino)butane (extraction amount X by mixed solution of ammonia/methanol=81% by mass, ratio X/Y of extraction amount X to extraction amount Y by water=0.11)

3-Indoleacetonitrile (extraction amount X by mixed solution of ammonia/methanol=80% by mass, ratio X/Y of extraction amount X to extraction amount Y by water=0.12)

n-Hexadecyltrimethylammonium bromide (extraction amount X by mixed solution of ammonia/methanol=18% by mass, ratio X/Y of extraction amount X to extraction amount Y by water=5.28)

TABLE 1

| | Granulation of silica base particles | | | | | | | | | | | | | Drying step | | |
|---|---|---|---|---|---|---|---|---|---|---|---|---|---|---|---|---|
| | | Methanol | Aqueous ammonia | Ammonia concentration % | Silane alkoxide | | Silane coupling agent | | N-containing compound | | Hydrophobing agent | | | Temperature °C. | pressure Mpa |
| | Granulation method | Mass [parts] | Mass [parts] | | Type | Mass [parts] | Type | Mass [parts] | Type | Mass [parts] | Type | Mass [parts] | Drying method | | |
| Example 1 | Sol-gel method | 950 | 166 | 9.6 | TMOS | 1000 | MTMS | 50 | TP-415 | 5 | — | — | Supercritical drying | 150 | 15 |
| Example 2 | Sol-gel method | 950 | 166 | 9.6 | TMOS | 1000 | MTMS | 50 | TP-415 | 2 | — | — | Spray drying | 100 | 0.1 |
| Example 3 | Sol-gel method | 950 | 166 | 9.6 | TMOS | 1000 | MTMS | 22 | TP-415 | 1 | — | — | Supercritical drying | 150 | 15 |
| Example 4 | Sol-gel method | 950 | 166 | 9.6 | TMOS | 1000 | MTMS | 190 | TP-415 | 45 | — | — | Supercritical drying | 150 | 15 |
| Example 5 | Sol-gel method | 950 | 72 | 16.7 | TMOS | 1000 | MTMS | 195 | TP-415 | 5 | — | — | Supercritical drying | 150 | 15 |
| Example 6 | Sol-gel method | 950 | 96 | 16.7 | TMOS | 1000 | MTMS | 120 | TP-415 | 5 | — | — | Supercritical drying | 150 | 15 |
| Example 7 | Sol-gel method | 950 | 200 | 10.0 | TMOS | 1000 | MTMS | 25 | TP-415 | 5 | — | — | Supercritical drying | 150 | 15 |
| Example 8 | Sol-gel method | 950 | 232 | 5.2 | TMOS | 1000 | MTMS | 22 | TP-415 | 5 | — | — | Supercritical drying | 150 | 15 |
| Example 9 | Sol-gel method | 950 | 166 | 9.6 | TMOS | 1000 | MTMS | 22 | TP-415 | 5 | — | — | Supercritical drying | 150 | 15 |
| Example 10 | Sol-gel method | 950 | 166 | 9.6 | TMOS | 1000 | MTMS | 190 | TP-415 | 5 | — | — | Supercritical drying | 150 | 15 |
| Example 11 | Sol-gel method | 950 | 166 | 9.6 | TMOS | 1000 | MTMS | 22 | TP-415 | 0.5 | — | — | Supercritical drying | 150 | 15 |
| Example 12 | Sol-gel method | 950 | 166 | 9.6 | TMOS | 1000 | MTMS | 25 | TP-415 | 3 | — | — | Supercritical drying | 150 | 15 |
| Example 13 | Sol-gel method | 950 | 166 | 9.6 | TMOS | 1000 | MTMS | 130 | TP-415 | 12 | — | — | Supercritical drying | 150 | 15 |
| Example 14 | Sol-gel method | 950 | 166 | 9.6 | TMOS | 1000 | MTMS | 180 | TP-415 | 19 | — | — | Supercritical drying | 150 | 15 |
| Example 15 | Sol-gel method | 950 | 166 | 9.6 | TMOS | 1000 | MTMS | 30 | TP-415 | 4 | — | — | Supercritical drying | 150 | 15 |
| Example 16 | Sol-gel method | 950 | 166 | 9.6 | TMOS | 1000 | MTMS | 50 | TP-415 | 4 | — | — | Supercritical drying | 150 | 15 |
| Example 17 | Sol-gel method | 950 | 166 | 9.6 | TMOS | 1000 | MTMS | 120 | TP-415 | 5 | — | — | Supercritical drying | 150 | 15 |
| Example 18 | Sol-gel method | 950 | 166 | 9.6 | TMOS | 1000 | MTMS | 180 | TP-415 | 5 | — | — | Supercritical drying | 150 | 15 |
| Example 19 | Sol-gel method | 950 | 110 | 9.1 | TMOS | 450 | MTMS | 100 | TP-415 | 10 | — | — | Supercritical drying | 150 | 15 |
| Example 20 | Sol-gel method | 950 | 220 | 9.1 | TMOS | 1000 | MTMS | 50 | TP-415 | 4 | — | — | Supercritical drying | 150 | 15 |
| Example 21 | Sol-gel method | 950 | 250 | 12.0 | TMOS | 1100 | MTMS | 50 | TP-415 | 4 | — | — | Supercritical drying | 150 | 15 |

TABLE 1-continued

| | Method | | | | | | | | | | | Drying | | |
|---|---|---|---|---|---|---|---|---|---|---|---|---|---|---|
| Example 22 | Sol-gel method | 900 | 55 | 9.1 | TMOS | 1000 | MTMS | 50 | TP-415 | 4 | — | Supercritical drying | 150 | 15 |
| Example 23 | Sol-gel method | 850 | 72 | 9.7 | TMOS | 1000 | MTMS | 50 | TP-415 | 4 | — | Supercritical drying | 150 | 15 |
| Example 24 | Sol-gel method | 950 | 177 | 9.6 | TMOS | 1000 | MTMS | 50 | TP-415 | 4 | — | Supercritical drying | 150 | 15 |
| Example 25 | Sol-gel method | 950 | 220 | 9.1 | TMOS | 1000 | MTMS | 50 | TP-415 | 4 | — | Supercritical drying | 150 | 15 |
| Example 26 | Sol-gel method | 950 | 166 | 9.6 | TMOS | 1000 | MTMS | 50 | TP-415 | 20 | — | Supercritical drying | 150 | 15 |
| Example 27 | Sol-gel method | 950 | 166 | 9.6 | TMOS | 1000 | MTMS | 50 | TP-415 | 0.53 | — | Supercritical drying | 150 | 15 |
| Example 28 | Sol-gel method | 950 | 166 | 9.6 | TMOS | 1000 | MTMS | 23 | TP-415 | 0.8 | — | Supercritical drying | 150 | 15 |
| Example 29 | Sol-gel method | 950 | 166 | 9.6 | TMOS | 1000 | MTMS | 30 | TP-415 | 1.2 | — | Supercritical drying | 150 | 15 |
| Example 30 | Sol-gel method | 950 | 166 | 9.6 | TMOS | 1000 | MTMS | 135 | TP-415 | 11 | — | Supercritical drying | 150 | 15 |
| Example 31 | Sol-gel method | 950 | 166 | 9.6 | TMOS | 1000 | MTMS | 142 | TP-415 | 15 | — | Supercritical drying | 150 | 15 |
| Example 32 | Sol-gel method | 950 | 166 | 9.6 | TMOS | 1000 | DTMS | 50 | TP-415 | 5 | — | Supercritical drying | 150 | 15 |
| Reference Example 1 | Sol-gel method | 950 | 166 | 9.6 | TMOS | 1000 | MTMS | 50 | Dimethylstearyl ammonium chloride | 5 | — | Supercritical drying | 150 | 15 |
| Reference Example 2 | Sol-gel method | 950 | 166 | 9.6 | TMOS | 1000 | MTMS | 50 | Tributylamine | 5 | — | Supercritical drying | 150 | 15 |
| Reference Example 3 | Sol-gel method | 950 | 166 | 9.6 | TMOS | 1000 | MTMS | 50 | Dimethyloctadecyl [3-(trimethoxysilyl)propyl]ammonium chloride | 5 | — | Supercritical drying | 150 | 15 |
| Reference Example 4 | Sol-gel method | 950 | 166 | 9.6 | TMOS | 1000 | MTMS | 50 | Quotanium-80 | 5 | — | Supercritical drying | 150 | 15 |
| Example 33 | Sol-gel method | 950 | 166 | 9.6 | TMOS | 1000 | MTMS | 50 | TP-415 | 5 | HMDS 50 | Supercritical drying | 150 | 15 |
| Example 34 | Drying method | — | — | — | — | — | MTMS | 50 | TP-415 | 5 | — | Supercritical drying | 150 | 15 |
| Example 35 | Sol-gel method | 950 | 166 | 9.6 | TMOS | 1000 | MTMS | 50 | TP-415 | 5 | — | Supercritical drying | 150 | 15 |
| Reference Example 5 | Sol-gel method | 950 | 166 | 9.6 | TMOS | 1000 | MTMS | 50 | Ditetrakis(dibutyldi-benzylammonium) molybdate | 5 | — | Supercritical drying | 150 | 15 |
| Reference Example 6 | Sol-gel method | 950 | 166 | 9.6 | TMOS | 1000 | MTMS | 50 | Phenethylamine | 5 | — | Supercritical drying | 150 | 15 |
| Reference Example 7 | Sol-gel method | 950 | 166 | 9.6 | TMOS | 1000 | MTMS | 50 | 4-(2-Octylamino)di-phenylamine | 5 | — | Supercritical drying | 150 | 15 |
| Reference Example 8 | Sol-gel method | 950 | 166 | 9.6 | TMOS | 1000 | MTMS | 50 | N-benzyl-N-methylethanolamine 2,3-Bis(2,6-diisopropylphenyl-imino)butane | 5 | — | Supercritical drying | 150 | 15 |
| Reference Example 9 | Sol-gel method | 950 | 166 | 9.6 | TMOS | 1000 | MTMS | 50 | 3-Indolacetonitrile | 5 | — | Supercritical drying | 150 | 15 |
| Comparative Example 1 | Sol-gel method | 950 | 166 | 9.6 | TMOS | 1000 | MTMS | 10 | TP-415 | 0.1 | — | Supercritical drying | 150 | 15 |

TABLE 1-continued

| | | | | | | | | | | | | | | | | | |
|---|---|---|---|---|---|---|---|---|---|---|---|---|---|---|---|---|---|
| Comparative Example 2 | Sol-gel method | 950 | 166 | | | | 1000 | MTMS | 260 | 20 | TP-415 | 50 | | | | | Supercritical drying | 150 | 15 |
| Comparative Example 3 | Sol-gel method | 950 | 166 | | | | 1000 | MTMS | 260 | 20 | N-Hexadecyltrimethyl-ammonium bromide | 0.2 | | | | | Supercritical drying | 150 | 15 |

Particle characteristics

| | Mo Net kcps | Mo/Si | Particle size nm | GSD | Circularity | Before baking at 350°C Pore volume A cm³/g | After baking at 350°C Pore volume B cm³/g | B/A | Volume resistivity before baking Ra Ω·cm | Volume resistivity after baking Rb Ω·cm | Ra/Rb | OH group amount Number/nm² | Degree of hydrophobicity % |
|---|---|---|---|---|---|---|---|---|---|---|---|---|---|
| Example 1 | 30.2 | 0.1431 | 61 | 1.16 | 0.88 | 0.52 | 0.87 | 1.67 | $1.0 \times 10^{10}$ | $1.0 \times 10^{11.5}$ | 0.032 | 2.91 | 35 |
| Example 2 | 11.4 | 0.0541 | 63 | 1.19 | 0.89 | 0.62 | 0.85 | 1.37 | $1.0 \times 10^{9.5}$ | $1.0 \times 10^{11.2}$ | 0.020 | 3.90 | 38 |
| Example 3 | 8.1 | 0.0385 | 62 | 1.16 | 0.88 | 0.18 | 0.21 | 1.20 | $1.0 \times 10^{11}$ | $1.0 \times 10^{11.5}$ | 0.316 | 5.42 | 18 |
| Example 4 | 73.9 | 0.3500 | 61 | 1.16 | 0.86 | 0.60 | 3.00 | 5.00 | $1.0 \times 10^{10.9}$ | $1.0 \times 10^{12.5}$ | 0.025 | 0.25 | 48 |
| Example 5 | 30.3 | 0.1431 | 62 | 1.15 | 0.87 | 2.10 | 2.70 | 1.29 | $1.0 \times 10^{11.1}$ | $1.0 \times 10^{12.9}$ | 0.016 | 0.15 | 55 |
| Example 6 | 29.6 | 0.1401 | 60 | 1.15 | 0.88 | 1.10 | 1.50 | 1.36 | $1.0 \times 10^{10.1}$ | $1.0 \times 10^{11.8}$ | 0.020 | 0.20 | 50 |
| Example 7 | 31.0 | 0.1471 | 61 | 1.16 | 0.88 | 0.20 | 0.40 | 2.00 | $1.0 \times 10^{8.2}$ | $1.0 \times 10^{11.0}$ | 0.002 | 5.41 | 21 |
| Example 8 | 34.0 | 0.1611 | 63 | 1.16 | 0.88 | 0.18 | 0.31 | 1.72 | $1.0 \times 10^{7.5}$ | $1.0 \times 10^{10.9}$ | 0.000 | 5.72 | 20 |
| Example 9 | 34.7 | 0.1646 | 61 | 1.16 | 0.88 | 0.12 | 0.20 | 1.67 | $1.0 \times 10^{8.1}$ | $1.0 \times 10^{11.2}$ | 0.001 | 5.48 | 23 |
| Example 10 | 31.1 | 0.1431 | 62 | 1.16 | 0.86 | 2.45 | 3.00 | 1.22 | $1.0 \times 10^{11.2}$ | $1.0 \times 10^{12.8}$ | 0.025 | 0.31 | 51 |
| Example 11 | 8.1 | 0.0385 | 60 | 1.16 | 0.87 | 0.17 | 0.22 | 1.29 | $1.0 \times 10^{10.1}$ | $1.0 \times 10^{10.9}$ | 0.158 | 5.28 | 16 |
| Example 12 | 17.7 | 0.0838 | 64 | 1.16 | 0.86 | 0.18 | 0.25 | 1.39 | $1.0 \times 10^{10.6}$ | $1.0 \times 10^{11.0}$ | 0.398 | 5.14 | 19 |
| Example 13 | 70.2 | 0.3327 | 62 | 1.16 | 0.87 | 0.50 | 1.50 | 3.00 | $1.0 \times 10^{10.8}$ | $1.0 \times 10^{11.9}$ | 0.079 | 0.31 | 52 |
| Example 14 | 65.5 | 0.3103 | 61 | 1.16 | 0.88 | 0.52 | 1.70 | 3.27 | $1.0 \times 10^{11.2}$ | $1.0 \times 10^{12.3}$ | 0.079 | 0.29 | 58 |
| Example 15 | 23.9 | 0.1134 | 61 | 1.16 | 0.87 | 0.20 | 0.28 | 1.40 | $1.0 \times 10^{9.5}$ | $1.0 \times 10^{11.2}$ | 0.020 | 4.98 | 20 |
| Example 16 | 25.9 | 0.1226 | 61 | 1.16 | 0.9 | 0.21 | 0.30 | 1.43 | $1.0 \times 10^{10.2}$ | $1.0 \times 10^{11.4}$ | 0.063 | 3.01 | 35 |
| Example 17 | 30.8 | 0.1431 | 63 | 1.16 | 0.89 | 1.45 | 1.80 | 1.24 | $1.0 \times 10^{10.8}$ | $1.0 \times 10^{11.9}$ | 0.079 | 0.31 | 49 |
| Example 18 | 29.6 | 0.1401 | 62 | 1.16 | 0.88 | 1.62 | 2.30 | 1.42 | $1.0 \times 10^{11.0}$ | $1.0 \times 10^{12.3}$ | 0.050 | 0.27 | 56 |
| Example 19 | 73.2 | 0.3467 | 10 | 1.29 | 0.77 | 0.98 | 2.82 | 2.88 | $1.0 \times 10^{10.8}$ | $1.0 \times 10^{11.8}$ | 0.100 | 0.60 | 59 |
| Example 20 | 23.9 | 0.1134 | 80 | 1.25 | 0.91 | 0.55 | 1.21 | 2.20 | $1.0 \times 10^{10.3}$ | $1.0 \times 10^{11.5}$ | 0.063 | 4.20 | 31 |
| Example 21 | 21.7 | 0.1027 | 200 | 1.18 | 0.93 | 0.58 | 1.31 | 2.26 | $1.0 \times 10^{10.1}$ | $1.0 \times 10^{10.9}$ | 0.158 | 4.40 | 25 |
| Example 22 | 23.9 | 0.1134 | 62 | 1.3 | 0.6 | 0.80 | 1.10 | 1.38 | $1.0 \times 10^{11.0}$ | $1.0 \times 10^{12.3}$ | 0.050 | 0.30 | 38 |
| Example 23 | 25.9 | 0.1226 | 62 | 1.17 | 0.7 | 0.81 | 1.01 | 1.25 | $1.0 \times 10^{11.1}$ | $1.0 \times 10^{12.1}$ | 0.100 | 0.50 | 37 |
| Example 24 | 25.1 | 0.1191 | 62 | 1.16 | 0.9 | 0.53 | 0.83 | 1.57 | $1.0 \times 10^{10.8}$ | $1.0 \times 10^{11.8}$ | 0.100 | 3.20 | 35 |
| Example 25 | 23.9 | 0.1134 | 62 | 1.17 | 0.96 | 0.42 | 0.73 | 1.74 | $1.0 \times 10^{10}$ | $1.0 \times 10^{12.0}$ | 0.032 | 3.50 | 34 |
| Example 26 | 69.0 | 0.3268 | 62 | 1.16 | 0.87 | 0.21 | 0.80 | 3.81 | $1.0 \times 10^{7}$ | $1.0 \times 10^{11.3}$ | 0.005 | 3.00 | 36 |
| Example 27 | 8.1 | 0.0385 | 62 | 1.16 | 0.85 | 0.70 | 0.85 | 1.21 | $1.0 \times 10^{11.5}$ | $1.0 \times 10^{11.5}$ | 0.501 | 2.98 | 35 |
| Example 28 | 8.8 | 0.0385 | 62 | 1.16 | 0.87 | 0.15 | 0.30 | 2.00 | $1.0 \times 10^{10.95}$ | $1.0 \times 10^{10.9}$ | 0.891 | 5.31 | 18 |
| Example 29 | 8.9 | 0.0420 | 62 | 1.16 | 0.86 | 0.25 | 0.33 | 1.32 | $1.0 \times 10^{11.0}$ | $1.0 \times 10^{11.1}$ | 0.794 | 5.01 | 21 |
| Example 30 | 67.8 | 0.3211 | 61 | 1.16 | 0.88 | 0.82 | 1.30 | 1.59 | $1.0 \times 10^{10.1}$ | $1.0 \times 10^{12.0}$ | 0.013 | 0.30 | 45 |
| Example 31 | 73.2 | 0.3467 | 63 | 1.16 | 0.89 | 0.93 | 1.52 | 1.63 | $1.0 \times 10^{10}$ | $1.0 \times 10^{12.2}$ | 0.006 | 0.31 | 48 |
| Example 32 | 29.5 | 0.1431 | 62 | 1.16 | 0.88 | 0.80 | 1.21 | 1.51 | $1.0 \times 10^{10.9}$ | $1.0 \times 10^{12.3}$ | 0.040 | 3.40 | 31 |
| Reference Example 1 | 0.0 | 0.0000 | 61 | 1.16 | 0.88 | 0.29 | 0.88 | 3.03 | $1.0 \times 10^{10.1}$ | $1.0 \times 10^{11.1}$ | 0.100 | 3.00 | 35 |
| Reference Example 2 | 0.1 | 0.0004 | 62 | 1.16 | 0.88 | 0.35 | 0.65 | 1.86 | $1.0 \times 10^{10.3}$ | $1.0 \times 10^{12.3}$ | 0.010 | 2.98 | 36 |
| Reference Example 3 | 0.0 | 0.0000 | 60 | 1.16 | 0.88 | 0.25 | 0.79 | 3.16 | $1.0 \times 10^{11}$ | $1.0 \times 10^{12.1}$ | 0.079 | 0.21 | 35 |
| Reference Example 4 | 0.2 | 0.0006 | 61 | 1.16 | 0.88 | 0.18 | 0.67 | 3.72 | $1.0 \times 10^{11.1}$ | $1.0 \times 10^{12.2}$ | 0.020 | 1.20 | 51 |

TABLE 1-continued

| | | | | | | | | | | |
|---|---|---|---|---|---|---|---|---|---|---|
| Example 33 | 30.2 | 0.1521 | 63 | 0.88 | 0.31 | 0.51 | 1.65 | $1.0 \times 10^{13}$ | 0.032 | 2.91 | 63 |
| Example 34 | 10.2 | 0.0495 | 61 | 0.71 | 0.38 | 0.46 | 1.21 | $1.0 \times 10^{12.8}$ | 0.010 | 0.15 | 35 |
| Example 35 | 31.1 | 0.1751 | 62 | 0.88 | 0.65 | 0.88 | 1.35 | $1.0 \times 10^{11.3}$ | 0.063 | 2.95 | 31 |
| Reference Example 5 | 0.2 | 0.0008 | 60 | 0.88 | 0.68 | 0.88 | 1.29 | $1.0 \times 10^{11.0}$ | 0.251 | 2.89 | 35 |
| Reference Example 6 | 0.1 | 0.0003 | 64 | 0.88 | 0.54 | 0.87 | 1.61 | $1.0 \times 10^{11.5}$ | 0.200 | 2.91 | 36 |
| Reference Example 7 | 0.2 | 0.0007 | 62 | 0.88 | 0.51 | 0.85 | 1.67 | $1.0 \times 10^{11.6}$ | 0.032 | 2.98 | 39 |
| Reference Example 8 | 0.1 | 0.0003 | 61 | 0.88 | 0.58 | 0.85 | 1.47 | $1.0 \times 10^{11.5}$ | 0.050 | 2.94 | 41 |
| Reference Example 9 | 0.1 | 0.0001 | 61 | 0.88 | 2.64 | 0.86 | 1.34 | $1.0 \times 10^{11.7}$ | 0.126 | 2.89 | 38 |
| Comparative Example 1 | 1.5 | 0.0072 | 61 | 0.89 | 0.14 | 0.15 | 1.07 | $1.0 \times 10^{11.0}$ | 1.000 | 5.61 | 10 |
| Comparative Example 2 | 101.0 | 0.6120 | 63 | 0.91 | 0.25 | 3.24 | 12.96 | $1.0 \times 10^{13.1}$ | 0.008 | 0.18 | 59 |
| Comparative Example 3 | 0.0 | 0.0000 | 61 | 0.88 | 0.18 | 0.20 | 1.11 | $1.0 \times 10^{11.3}$ | 0.001 | 2.91 | 18 |

| | | | | | | Evaluation | | | |
|---|---|---|---|---|---|---|---|---|---|
| | Si—CP/MAS Area ratio C % | Si—CP/MAS Ratio C/D — | N-containing compound Content (in terms of N atoms) % by mass | Charge amount at high humidity FA μC | Charge amount at low humidity FC μC | Environmental dependence of capacitance — | Charge distribution at low temperature and low humidity | Narrow charge distribution retentivity at high temperature and high humidity | Narrow charge distribution retentivity at low temperature and low humidity |
| Example 1 | 7.6 | 0.156 | 0.040 | 25.5 | 30.2 | A(◎) | A(◎) | A(◎) | A(◎) |
| Example 2 | 7.5 | 0.154 | 0.014 | 22.5 | 27.8 | A(◎) | A(◎) | A(◎) | A(◎) |
| Example 3 | 5.5 | 0.101 | 0.009 | 23.5 | 35.0 | B(○) | B(○) | B(○) | B(○) |
| Example 4 | 45.0 | 0.718 | 0.371 | 31.0 | 32.3 | A(◎) | B(○) | B(○) | B(○) |
| Example 5 | 46.0 | 0.742 | 0.040 | 30.1 | 33.8 | A(◎) | A(◎) | A(◎) | A(◎) |
| Example 6 | 27.0 | 0.471 | 0.039 | 28.1 | 30.5 | A(◎) | B(○) | A(◎) | B(○) |
| Example 7 | 3.9 | 0.121 | 0.041 | 23.1 | 25.6 | A(◎) | B(○) | A(◎) | B(○) |
| Example 8 | 5.1 | 0.102 | 0.042 | 21.0 | 23.8 | A(◎) | A(◎) | B(○) | B(○) |
| Example 9 | 4.9 | 0.105 | 0.039 | 23.0 | 25.8 | A(◎) | B(○) | A(◎) | A(◎) |
| Example 10 | 45.1 | 0.721 | 0.005 | 32.3 | 36.8 | A(◎) | A(◎) | B(○) | B(○) |
| Example 11 | 5.1 | 0.103 | 0.024 | 20.5 | 30.8 | B(○) | B(○) | A(◎) | A(◎) |
| Example 12 | 5.1 | 0.125 | 0.101 | 22.1 | 32.1 | B(○) | B(○) | A(◎) | B(○) |
| Example 13 | 29.8 | 0.492 | 0.155 | 29.8 | 33.5 | A(◎) | A(◎) | B(○) | A(◎) |
| Example 14 | 4.2 | 0.298 | 0.033 | 30.1 | 36.8 | A(◎) | B(○) | A(◎) | A(◎) |
| Example 15 | 5.0 | 0.135 | 0.033 | 22.1 | 28.1 | B(○) | B(○) | A(◎) | B(○) |
| Example 16 | 9.6 | 0.157 | 0.040 | 25.8 | 31.2 | A(◎) | A(◎) | A(◎) | A(◎) |
| Example 17 | 27.5 | 0.480 | 0.040 | 25.6 | 32.1 | A(◎) | A(◎) | A(◎) | B(○) |
| Example 18 | 42.1 | 0.661 | 0.083 | 28.1 | 36.1 | A(◎) | A(◎) | A(◎) | A(◎) |
| Example 19 | 53.1 | 0.749 | 0.030 | 32.5 | 35.1 | A(◎) | A(◎) | A(◎) | B(○) |
| Example 20 | 9.6 | 0.153 | 0.030 | 25.2 | 31.5 | A(◎) | A(◎) | A(◎) | B(○) |
| Example 21 | 8.5 | 0.148 | 0.032 | 22.3 | 29.1 | A(◎) | A(◎) | A(◎) | B(○) |
| Example 22 | 9.7 | 0.155 | 0.032 | 28.1 | 37.8 | B(○) | A(◎) | A(◎) | B(○) |
| Example 23 | 9.4 | 0.156 | 0.031 | 28.5 | 37.2 | B(○) | B(○) | A(◎) | B(○) |

TABLE 1-continued

| | | | | | | | |
|---|---|---|---|---|---|---|---|
| Example 24 | 9.5 | 0.154 | 0.032 | 25.4 | 32.1 | B(○) | A(◉) | B(○) |
| Example 25 | 9.3 | 0.157 | 0.031 | 23.0 | 28.9 | B(○) | B(○) | B(○) |
| Example 26 | 9.1 | 0.149 | 0.168 | 24.5 | 26.1 | A(◉) | A(◉) | B(○) |
| Example 27 | 9.5 | 0.155 | 0.005 | 28.5 | 37.1 | B(○) | B(○) | B(○) |
| Example 28 | 5.1 | 0.109 | 0.008 | 25.1 | 36.9 | B(○) | B(○) | B(○) |
| Example 29 | 5.2 | 0.128 | 0.012 | 26.8 | 37.1 | A(◉) | A(◉) | A(◉) |
| Example 30 | 31.0 | 0.510 | 0.092 | 26.5 | 30.5 | A(◉) | A(◉) | B(○) |
| Example 31 | 33.5 | 0.531 | 0.131 | 28.1 | 30.1 | A(◉) | A(◉) | B(○) |
| Example 32 | 9.8 | 0.158 | 0.042 | 31.2 | 38.1 | A(◉) | A(◉) | B(○) |
| Reference Example 1 | 9.1 | 0.154 | 0.210 | 24.8 | 30.5 | A(◉) | B(○) | C(Δ) |
| Reference Example 2 | 9.3 | 0.157 | 0.370 | 28.1 | 31.2 | A(◉) | B(○) | C(Δ) |
| Reference Example 3 | 8.5 | 0.510 | 0.140 | 29.9 | 35.5 | A(◉) | B(○) | C(Δ) |
| Reference Example 4 | 9.1 | 0.150 | 0.118 | 30.1 | 35.2 | A(◉) | B(○) | C(Δ) |
| Reference Example 5 | 8.9 | 0.156 | 0.040 | 25.5 | 30.2 | A(◉) | A(◉) | A(◉) |
| Reference Example 6 | 5.9 | 0.142 | 0.030 | 32.1 | 41.2 | B(○) | A(◉) | B(○) |
| Reference Example 7 | 8.0 | 0.153 | 0.091 | 25.1 | 37.2 | A(◉) | A(◉) | A(◉) |
| Reference Example 8 | 8.9 | 0.156 | 0.449 | 22.5 | 36.5 | B(○) | B(○) | C(Δ) |
| Reference Example 9 | 9.5 | 0.155 | 0.212 | 25.4 | 36.9 | B(○) | B(○) | C(Δ) |
| Reference Example 10 | 9.4 | 0.156 | 0.400 | 25.3 | 37.8 | B(○) | B(○) | C(Δ) |
| Reference Example 11 | 9.5 | 0.157 | 0.168 | 25.9 | 38.1 | B(○) | B(○) | C(Δ) |
| Reference Example 12 | 9.9 | 0.159 | 0.412 | 25.5 | 36.9 | B(○) | B(○) | C(Δ) |
| Comparative Example 1 | 2.6 | 0.040 | 0.001 | 22.1 | 41.5 | D(X) | D(X) | D(X) |
| Comparative Example 2 | 65.0 | 0.922 | 0.251 | 20.5 | 23 | A(◉) | C(Δ) | B(○) |
| Comparative Example 3 | 4.2 | 0.120 | 0.007 | 18.9 | 28.3 | B(○) | D(X) | D(X) |

The above results show that the silica particles of examples have a narrower charge distribution when charged and have a better narrow charge distribution retentivity, compared to silica particles of comparative examples.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. Silica particles comprising:
   silica base particles;
   a reaction product of a trifunctional silane coupling agent, the reaction product covers at least a part of a surface of the silica base particles; and
   a nitrogen element-containing compound containing a molybdenum element,
   wherein an amount of the reaction product is 5.5% by mass or more and 30% by mass or less with respect to an amount of the silica particles, and
   a ratio (Mo/Si) of Net intensity of the molybdenum element to Net intensity of a silicon element measured by X-ray fluorescence analysis is 0.035 or more and 0.35 or less.

2. The silica particles according to claim 1,
   wherein the nitrogen element-containing compound is at least one compound selected from the group consisting of a quaternary ammonium salt containing a molybdenum element and a mixture of a quaternary ammonium salt and a metal oxide containing a molybdenum element.

3. The silica particles according to claim 1,
   wherein the silica particles have a number average particle size of 10 nm or more and 200 nm or less.

4. The silica particles according to claim 1,
   wherein the nitrogen element-containing compound is adsorbed onto at least a part of pores of the reaction product.

5. The silica particles according to claim 1,
   wherein the silica particles have a degree of hydrophobicity of 10% or more and 60% or less.

6. The silica particles according to claim 1,
   wherein in a case where A represents a pore volume of pores having a diameter of 1 nm or more and 50 nm or less determined from a pore size distribution curve obtained by a nitrogen adsorption method before baking at 350° C., and B represents a pore volume of pores having a diameter of 1 nm or more and 50 nm or less determined from a pore size distribution curve obtained by a nitrogen adsorption method after baking at 350° C., B/A is 1.2 or more and 5 or less, and B is 0.2 cm$^3$/g or more and 3 cm$^3$/g or less.

7. The silica particles according to claim 1,
   wherein in a case where C represents an integral value of signals observed in a range of chemical shift of −50 ppm or more and −75 ppm or less in a $^{29}$Si solid-state nuclear magnetic resonance (NMR) spectrum obtained by a cross-polarization/magic angle spinning (CP/MAS) method, and D represents an integral value of signals observed in a range of chemical shift of −90 ppm or more and −120 ppm or less in the same spectrum, a ratio C/D is 0.10 or more and 0.75 or less.

8. The silica particles according to claim 1,
   wherein an extraction amount X of the nitrogen element-containing compound by a mixed solution of ammonia/methanol is 0.1% by mass or more, and
   the extraction amount X of the nitrogen element-containing compound and an extraction amount Y of the nitrogen element-containing compound by water satisfy Expression: Y/X<0.3.

9. The silica particles according to claim 1,
   wherein the silica particles have an average circularity of 0.60 or more and 0.96 or less.

10. The silica particles according to claim 1,
    wherein the silica particles have a number-based particle size distribution index of 1.1 or more and 2.0 or less.

* * * * *